(12) United States Patent
Jiang et al.

(10) Patent No.: US 10,153,519 B2
(45) Date of Patent: Dec. 11, 2018

(54) DEFORMABLE ORIGAMI BATTERIES

(71) Applicant: ARIZONA BOARD OF REGENTS ON BEHALF OF ARIZONA STATE UNIVERSITY, Scottsdale, AZ (US)

(72) Inventors: Hanqing Jiang, Chandler, AZ (US); Hongyu Yu, Chandler, AZ (US); Zeming Song, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 276 days.

(21) Appl. No.: 15/104,217

(22) PCT Filed: Dec. 24, 2014

(86) PCT No.: PCT/US2014/072354
§ 371 (c)(1),
(2) Date: Jun. 13, 2016

(87) PCT Pub. No.: WO2015/100414
PCT Pub. Date: Jul. 2, 2015

(65) Prior Publication Data
US 2016/0315352 A1    Oct. 27, 2016

Related U.S. Application Data

(60) Provisional application No. 61/921,316, filed on Dec. 27, 2013.

(51) Int. Cl.
*H01M 2/02*    (2006.01)
*H01M 4/66*    (2006.01)
(Continued)

(52) U.S. Cl.
CPC ....... *H01M 10/0583* (2013.01); *H01M 2/026* (2013.01); *H01M 4/661* (2013.01);
(Continued)

(58) Field of Classification Search
CPC ........ H01M 2/026; H01M 2/18; H01M 4/661; H01M 4/663; H01M 4/667; H01M 4/70;
(Continued)

(56) References Cited

U.S. PATENT DOCUMENTS 4,922,059 A    5/1990  Walker et al.
5,008,496 A    4/1991  Schmidt et al.
(Continued)

FOREIGN PATENT DOCUMENTS

CN         1610168 A      4/2005
WO     2001094253 A2    12/2001
(Continued)

OTHER PUBLICATIONS

Cheng, Q. et al. "Folding paper-based lithium batteries for higher areal energy densities". Nano Letters. Sep. 23, 2013. vol. No. 10. pp. 4969-4974.*
(Continued)

*Primary Examiner* — Brittany L Raymond
(74) *Attorney, Agent, or Firm* — Michael Best & Friedrich LLP

(57) ABSTRACT

The invention is drawn to a lithium-ion battery containing a packaging material, an anode current collector, an anode electrode, a separator, a cathode electrode, and a cathode current collector, wherein those components are layered to form a planar battery. The planar battery is folded using rigid origami, such as Miura folding, to yield a folded, deformable lithium-ion battery.

27 Claims, 46 Drawing Sheets

(51) Int. Cl.

| | |
|---|---|
| *H01M 4/70* | (2006.01) |
| *H01M 10/04* | (2006.01) |
| *H01M 10/0525* | (2010.01) |
| *H01M 10/0583* | (2010.01) |
| *H01M 10/052* | (2010.01) |
| *H01M 10/058* | (2010.01) |
| *H01M 2/18* | (2006.01) |
| *H01M 4/02* | (2006.01) |

(52) U.S. Cl.
CPC ........... *H01M 4/663* (2013.01); *H01M 4/667* (2013.01); *H01M 10/045* (2013.01); *H01M 10/052* (2013.01); *H01M 10/0525* (2013.01); *H01M 2/18* (2013.01); *H01M 4/70* (2013.01); *H01M 10/058* (2013.01); *H01M 2004/025* (2013.01)

(58) Field of Classification Search
CPC ......... H01M 2004/025; H01M 10/045; H01M 10/052; H01M 10/0525; H01M 10/058; H01M 10/0583
See application file for complete search history.

(56) References Cited

U.S. PATENT DOCUMENTS

| | | |
|---|---|---|
| 5,115,344 A | 5/1992 | Jaskie |
| 5,121,297 A | 6/1992 | Haas |
| 5,168,384 A | 12/1992 | Genba |
| 5,519,596 A | 5/1996 | Woolverton |
| 5,648,771 A | 7/1997 | Halgren et al. |
| 5,903,440 A | 5/1999 | Blazier et al. |
| 5,969,783 A | 10/1999 | Takiar et al. |
| 6,050,962 A | 4/2000 | Kramer et al. |
| 6,299,337 B1 | 10/2001 | Bachl et al. |
| 6,384,890 B1 | 5/2002 | Takiar et al. |
| 6,455,931 B1 | 9/2002 | Hamilton, Jr. et al. |
| 6,476,733 B1 | 11/2002 | Amiri |
| 6,482,540 B1 | 11/2002 | Gozdz et al. |
| 6,584,857 B1 | 7/2003 | Furlani et al. |
| 6,695,457 B2 | 2/2004 | van Drieenhuizen et al. |
| 6,880,955 B2 | 4/2005 | Lin |
| 6,936,855 B1 | 8/2005 | Harrah |
| 7,201,511 B2 | 4/2007 | Moriyama et al. |
| 7,215,547 B2 | 5/2007 | Chang et al. |
| 7,265,719 B1 | 9/2007 | Moosbrugger et al. |
| 7,513,664 B2 | 4/2009 | Chou |
| 8,080,736 B2 | 12/2011 | DeNatale et al. |
| 8,658,904 B2 | 2/2014 | Naganuma et al. |
| 9,706,646 B2 | 7/2017 | Jiang et al. |
| 2002/0094701 A1 | 7/2002 | Biegelsen et al. |
| 2003/0122476 A1 | 7/2003 | Wang et al. |
| 2004/0118595 A1 | 6/2004 | Flammer et al. |
| 2004/0172820 A1 | 9/2004 | Lopez |
| 2005/0099361 A1 | 5/2005 | Majer |
| 2005/0110702 A1 | 5/2005 | Aoki et al. |
| 2005/0280157 A1 | 12/2005 | Roush et al. |
| 2006/0063351 A1 | 3/2006 | Jain |
| 2006/0082298 A1 | 4/2006 | Becken et al. |
| 2006/0113279 A1 | 6/2006 | Little |
| 2007/0090457 A1 | 4/2007 | Lee et al. |
| 2007/0166845 A1 | 7/2007 | Yokokawa |
| 2007/0270315 A1 | 12/2007 | Laves et al. |
| 2008/0093110 A1 | 4/2008 | Bagung |
| 2008/0093118 A1 | 4/2008 | Takahashi et al. |
| 2008/0101070 A1 | 5/2008 | Chou |
| 2008/0125510 A1 | 5/2008 | Crosby et al. |
| 2008/0158498 A1 | 7/2008 | Chang et al. |
| 2008/0179079 A1 | 7/2008 | Ishii et al. |
| 2008/0289859 A1 | 11/2008 | Mikado et al. |
| 2009/0009046 A1 | 1/2009 | Oh et al. |
| 2009/0103295 A1 | 4/2009 | Wang |
| 2009/0167171 A1 | 7/2009 | Jung et al. |
| 2009/0207560 A1 | 8/2009 | Lee |
| 2009/0283891 A1 | 11/2009 | Dekker et al. |
| 2009/0297776 A1 | 12/2009 | Crosby et al. |
| 2009/0310209 A1 | 12/2009 | Aschwanden et al. |
| 2009/0310221 A1 | 12/2009 | Aschwanden |
| 2010/0011529 A1 | 1/2010 | Won et al. |
| 2010/0053207 A1 | 3/2010 | Cohen et al. |
| 2010/0143677 A1 | 6/2010 | Lee et al. |
| 2010/0149640 A1 | 6/2010 | Paek et al. |
| 2010/0307705 A1 | 12/2010 | Rahm et al. |
| 2011/0096545 A1 | 4/2011 | Chang |
| 2011/0227822 A1 | 9/2011 | Shai |
| 2011/0228536 A1 | 9/2011 | Im et al. |
| 2012/0143525 A1 | 6/2012 | Chen et al. |
| 2012/0146050 A1 | 6/2012 | Adam et al. |
| 2012/0168009 A1 | 7/2012 | Chen et al. |
| 2012/0170244 A1 | 7/2012 | Kwon et al. |
| 2012/0202101 A1 | 8/2012 | Jeda |
| 2012/0212820 A1 | 8/2012 | Jiang et al. |
| 2012/0292504 A1 | 11/2012 | Nojima |
| 2014/0204300 A1 | 7/2014 | Park et al. |
| 2015/0342050 A1 | 11/2015 | Jiang et al. |
| 2016/0313478 A1 | 10/2016 | Lee et al. |

FOREIGN PATENT DOCUMENTS

| | | |
|---|---|---|
| WO | WO 03-021679 | 3/2003 |
| WO | WO 2014029908 | 2/2014 |
| WO | 2014113489 A1 | 7/2014 |

OTHER PUBLICATIONS

Äyräs P. et al., "Diffraction Gratings in Sol-gel Films by Direct Contact Printing Using a UV-mercury Lamp" 162 Opt. Comms. 215-218 (1999).

Fang Y. et al., "Resonant Waveguild Grating Biosensor for Living Cell Sensing" 91 Biophys. J. 1925-940 (2006).

Gudeman CS. et al., "Using the Grating Lite Valve Device as a Multichannel Variable Optical Attenuator (VOA) for the 1.55-µm Spectral Region" 4653 Proc. SPIE 56-61 (2002).

Albert K. Harris et al., "Silicone Rubber Substrata: A New Wrinkle in the Study of Cell Locomotion" 208 Science 177-179 (1980).

Huang R., "Kinetic Wrinkling of an Elastic Film on a Viscoelastic Substrate" 53 J. Mech. Phys. Solids 63-89 (2005).

Z. Y. Huang et al., "Nonlinear Analyses of Wrinkles in a Film Bonded to a Compliant Substrate" 53 J. Mech. Phys. Solids 2101-118 (2005).

Wilhelm T. S. Huck et al., "Ordering of Spontaneously Formed Buckles on Planar Surfaces" 16 Langmuir 3497-501 (2000).

Hanging Jiang et al., "Finite Width Effect of Thin-films Buckling on Compliant substrate: Experimental and Theoretical Studies" 56 J. Mech. Phys. Solids 2585-598 (2008).

Cunjiang Yu et al., "Thermoresponsiveness of Integrated Ultra-Thin Silicon with Poly(N-isopropylacrylamide) Hydrogels" 32 Macromol. Rapid Commun. 820 (2011).

Cunjiang Yu et al., "Silicon Thin Films as Anodes for High-Performance Lithium-Ion batteries with Effective Stress Relaxation" 2 Adv. Energy Mater. 68 (2012).

David C. Duffy et al., "Rapid Prototyping of Microfluidic Systems in Poly(dimethylsiloxane)" 70 Anal. Chem. 4974 (1998).

Daniel H. Raguin and G. Michael Morris, "Antireflection Structured Surfaces for the Infrared Spectral Region" 32 Appl. Opt. 1154-167 (1993).

Christopher M. Stafford et al., "A Buckling-based Metrology for Measuring the Elastic Moduli of Polymetric Thin Films" 3 Nat. Mater. 545-550 (2004).

Chee Wei Wong et al., "Analog Tunable Gratings Driven by Thin-film Piezoelectric Microelectromechanical Actuators" 42 Appl. Opt. 621-626 (2003).

A. Azzam Yasseen et al., "Diffraction Grating Scanners Using Polysilicon Micromotors" 5 IEEE J. Sel. Top. Quantum Electron. 75-82 (1999).

M. Ouyang et al., "Conversion of Some Siloxane Polymers to Silicon Oxide by UV/Ozone Photochemical Processes" 12 Chem. Mater. 1591 (2000).

(56) References Cited

OTHER PUBLICATIONS

E. Cerda et al., "Thin Films: Wrinkling of an Elastic Sheet Under Tension" 419 Nature 579 (2002).
Christopher Harrison et al., "Sinusoidal Phase Grating Created by a Tunably Buckled Surface" 85 Appl. Phys. Lett. 4016-4018 (2004).
Ned Bowden et al., "Spontaneous Formation of Ordered Structures in Thin Films of Metals Supported on an Elastomeric Polymer" 393 Nature 146-149 (1998).
Takuya Ohzono and Masatsugu Shimomura, "Geometry-dependent Stripe Rearrangement Processes Induced by Strain on Preordered Microwrinkle Patterns" 21 Langmuir 7230-7237 (2005).
Kevin Chen et al., "Facile Large-area Photolithography of Periodic Sub-micron Structures Using a Self-formed Polymer Mask" 100 App. Phys. Lett 233503 (2012).
F.S. Chen et al., "Holographic Storage in Lithium Niobate" 13 Appl. Phys. Lett. 223 (1968).
Kahp Y. Suh et al., "A Simple Soft Lithographic Route to Fabrication of Poly(ethylene glycol) Microstructures for Protein and Cell Patterning" 25 Biomaterials 557 (2004).
Anne Horn et al., "Ordering and Printing Virus Arrays: A straight-forward Way to Functionalize Surfaces" 6 Small 2122 (2010).
Jonathan G. C. Veinot et al., "Fabrication and Properties of Organic Light-Emitting "Nanodiode" Arrays" 2 Nano Lett. 333 (2002).
Yoshihiro Koide et al., "Hot Microcontact Printing for Patterning ITO Surfaces. Methodology, Morphology, Microstructure, and OLED Charge Injection Barrier Imaging" 19 Langmuir 86 (2003).
Cunjiang Yu et al., "Tunable Optical Gratings Based on Buckled Nanoscale Thin Films on Transparent Elastomeric Substrates" 96 Appl. Phys. Lett. 041111 (2010).
Zhiyong Fan et al., "Three-dimensional Nanopillar-array Photovolta-ics on Low-cost and Flexible Substrates" 8 Nat. Mat. 648 (2009).
C. Vieu et al., "electron Beam Lithography: Resolution Limits and Applications" 164 Appl. Surf. Sci. 111 (2000).
Burn Jeng Lin, "Deep UV Lithography" 12 J. Vac. Sci. Technol. 1317 (1975).
Leon A. Woldering et al., "Periodic Arrays of Deep Nanopores Made in Silicon with Reactive Ion Etching and Deep UV Lithography" 19 Nanotechnology 145304 (2008).
Dong Sik Kim et al., "Laser-Interference Lithography Tailored for Highly Symmetrically Arranged ZnO Nanowire Arrays" 3 Small 76 (2007).
Johannes de Boor et al., "Three-beam Interference Lithography: Upgrading a Lloyd's Interferometer for Single-exposure Hexagonal Patterning" 34 Opt. Lett. 1783 (2009).
Ampere A Tseng et al., "Nanofabrication by Scanning Probe Microscope Lithography: A Review" 23 J. Vac. Sci. Technol. B 877 (2005).
Younan Xia et al., "Unconventional Methods for Fabricating and Patterning Nanostructures" 99 Chem. Rev. 1823 (1999).
L. Jay Guo, "Nanoimprint Lithography: Methods and Material Requirements" 19 Adv. Mater. 495 (2007).
Helmut Schift, "Nanoimprint Lithography: An Old Story in Modern Times? A Review" 26 J. Vac. Sci. Technol. B 458 (2008).
J. Y. Cheng et al., "Fabrication of Nanostructures with Long-range Order Using Block Copolymer Lithography" 81 Appl. Phys. Lett. 3657 (2002).
Tae-Woo Lee et al., "Soft-Contact Optical Lithography Using Transparent Elastomeric Stamps: Application to Nanopatterned Organic Light-Emitting Devices" 15 Adv. Funct. Mater. 1435 (2005).
John A. Rogers et al., "Using an Elastomeric Phase Mask for Sub-100nm Photolithography in the Optical Near Field" 70 Appl. Phys. Lett. 2658 (1997).
Dong Qin et al., "Photolithography with Transparent Reflective Photomasks" 16 J. Vac. Sci. Technol. B 98 (1998).
Zhi-Yuan Li et al., "Optimization of Elastomeric Phase Masks for Near-field Photolithography" 78 Appl. Phys. Lett. 2431 (2001).
John A. Rogers et al., "Generating ~90 Nanometer Features Using Near-field Contact-mode Photolithography with an Elastomeric Phase Mask" 16 J. Vac. Sci. Technol. B 59 (1998).

Daniel J. Shir et al., "Three-Dimensional Nanofabrication with Elastomeric Phase Masks" 111 J. Phys. Chem. B 12945 (2007).
Alexandra Schweikart and Andreas Fety, "Controlled Wrinkling as a Novel Method for the Fabrication of Patterned Surfaces" 165 Microchim. Acta 249 (2009).
Won Mook Choi et al., "Biaxially Stretchable "Wavy" Silicon Nanomembranes" 7 Nano Lett. 1655 (2007).
Kirill Efimenko et al., "Nested Self-similar Wrinkling Patterns in Skins" 4 Nat. Mater. 293 (2005).
Byung-Ho Jo et al., "Three-Dimensional Micro-Channel Fabrication in Polydimethylsiloxane (PDMS) Elastomer" 9 J. Microelectromech. Syst. 76 (2000).
Conghua Lu et al., "A Lithography-free Method for Directed Colloidal Crystal Assembly Based on Wrinkling" 3 Soft Matter 1530 (2007).
Heinz Schmid et al., "Preparation of Metallic Films on Elastomeric Stamps and their Application for Contact Processing and Contact Printing" 13 Adv. Funct. Mater. 145 (2003).
Cheryl S. Selvanayagam et al., "Nonlinear Thermal Stress/Strain Analyses of Copper Filled TSV (Through Silicon Via) and their Flip-Chip Microbumps" 32 III Trans. Adv. Pack. 720 (2009).
James S. Sharp and Richard. A. L. Jones, "Micro buckling as a Route Towards Surface Patterning" 14 Adv. Mater. 799 (2002).
Pimpon Uttayarat et al., "Topographic Guidance of endothelial Cells on Silicone Sufraces with Micro- to Nanogrooves: Orientation of Actin Filaments and Focal Adhesions" 75 J. Biomed. Mater. Res. A 668 (2005).
Cunjiang Yu and Hanquing Jiang, "Forming Wrinkled Stiff Films on Polymeric Substrates at Room Temperature for Stretchable Interconnects Applications" 519 Thin Solid Films 818 (2010).
C. Yu et al., "Stretchable Supercapacitors Based on Buckled Single-Walled Carbon Nanotube Macrofilms", Adv. Mater., 21, pp. 4793-4797 (2009).
C. Yu et al., "A stretchable temperature sensor based on elastically buckled thin film devices on elastomeric substrates", Appl. Phys. Lett. 95, 141902 (2009).
H. Jiang et al., Finite deformation mechanics in buckled thin films on compliant supports, PNAS, vol. 104., No. 40, pp. 15607-15612 (2007).
D.-Y. Khang et al., "A Stretchable Form of Single-Crystal Silicon for High-Performance Electronics on Rubber Substrates", Science, vol. 311 pp. 208-212 (2006).
S.P. Lacour et al., "Stretchable Interconnects for Elastic Electronic Surfaces", Proc. IEEE, vol. 93, No. 8, pp. 1459-1467 (2005).
International Search Report and Written Opinion for PCT/US2014/065776, dated Apr. 22, 2015.
T MA et al., "Micro-strain sensing using wrinkled stiff thin films on soft substrates as tunable optical grating", Optics Express, vol. 21, No. 10, pp. 11994-12001 (2013).
X. Jiang et al., "Controlling Mammalian Cell Spreading and Cytoskeletal Arrangement with Conveniently Fabricated Continuous Wavy Features on Poly(dimethylsiloxane)", Langmuir 18(8), 3273-3280 (2002).
S. Wagner et al., "Electronic skin: architecture and components," Physica E 25(2-3), 326-334 (2004).
S. P. Lacour et al., "Design and performance of thin metal film interconnects for skin-like electronic circuits," IEEE Electron Device Lett. 25(4), 179-181 (2004).
S. P. Lacour et al., "Stretchable gold conductors on elastomeric substrates," Appl. Phys. Lett. 82(15), 2404-2406 (2003).
S. P. Lacour, S. Wagner, R. J. Narayan, T. Li, and Z. Suo, "Stiff subcircuit islands of diamondlike carbon for stretchable electronics," J. Appl. Phys. 100(1), 014913 (2006).
H. Q. Jiang et al., "Mechanics of precisely controlled thin film buckling on elastomeric substrate," Appl. Phys. Lett. 90(13), 133119 (2007).
K.M. Choi et al., "A photocurable poly(dimethylsiloxane) chemistry designed for soft lithographic molding and printing in the nanometer regime," J. Am. Chem. Soc. 125(14), 4060-4061 (2003).
Song et al., "Origami 1 ithiwn-ion batteries," brochure, Nature Communications, Jan. 8, 2014, vol. 5, article No. 3140, pp. 1-6 see pp. 2-3; Methods in p. 6; figure 1.
Xu et al., "Stretchable batteries with self-similar serpentine interconnects and integrated wireless recharging systems", Nature Com-

(56) References Cited

OTHER PUBLICATIONS munications, Feb. 26, 2013, vol. 4, article No. 1543, pp. 1-8 see abstract; pp. 2-4; Methods in p. 7; figures 1-3.
PCT/US2015/052205 International Search Report and Written Opinion of the International Searching Authority dated Dec. 23, 2015 (9 pages).
PCT/US2015/068038 International Search Report and Written Opinion of the International Searching Authority dated May 4, 2016 (9 pages).
Asundi et al., "Optical strain sensor using position-sensitive detector and diffraction grating: error analysis," Optical Engineering 39.6 (2000): 1645-1651.
Hu, L.; Cui, H. Energy Environ. Sci. 2012, 6423-6435.
Huang, J.; Zhu, H.; Chen, Y.; Preston, C.; Rohrbach, K.; Cumings, J.; Hu, L. ACS Nano 2013, 2106-2113.
Dragoman, M.; Flahaut, E.; Dragoman, D.; Al Ahmad, M.; Plana, R. Nanotechnology 2009, 375203.
Liu, H.; Crooks, R. M. Anal. Chem. 2012, 2528-2532.
Lankelma, J.; Nie, Z.; Carrilho, E.; Whitesides, G. M. Anal. Chem. 2012, 4147-4152.
Liu, H.; Crooks, R. M. J. Am. Chem. Soc. 2011, 17564-17566.
Dungchai, W.; Chailapakul, O.; Henry, C. S. Anal. Chem. 2009, 5821-5826.
Martinez, A. W.; Phillips, S. T.; Whitesides, G. M.; Carrilho, E. Anal. Chem. 2010, 3-10.
Siegel, A. C.; Phillips, S. T.; Wiley, B. J.; Whitesides, G. M. Lab Chip 2009, 2775-2781.
Hu, L.; Zheng, G.; Yao, J.; Liu, N.; Weil, B.; Eskilsson, M.; Karabulut, E.; Ruan, Z.; Fan, S.; Bloking, J. T.; McGehee, M. D.; Wagberg, L.; Cui, Y. Energy Environ. Sci. 2013, 513-518.
Russo, A.; Ahn, B. Y.; Adams, J. J.; Duoss, E. B.; Bernhard, J. T.; Lewis, J. A. Adv. Mater. 2011, 3426-3430.
Yuan, L.; Yao, B.; Hu, B.; Huo, K.; Chen, W.; Zhou, J. Energy Environ. Sci. 2013, 470-476.
Olsson, H.; Carlsson, D. O.; Nystrom, G.; Sjodin, M.; Nyholm, L.; Stromme, M. J. Mater. Sci. 2012, 5317-5325.
Razaq, A.; Nyholm, L.; Sjödin, M.; Strømme, M.; Mihranyan, A. Adv. Energy Mater. 2012, 445-454.
Jabbour, L.; Destro, M.; Chaussy, D.; Gerbaldi, C.; Penazzi, N.; Bodardo, S.; Beneventi, D. Cellulose 2013, 571-582.
Chun, S. J.; Choi, E. S.; Lee, E. H.; Kim, J. H.; Lee, S. Y.; Lee, S. Y. J. Mater. Chem. 2012, 16618-16626.
Xu, S.; Zhang, Y.; Cho, J.; Lee, J.; Huang, X.; Jia, L.; Fan, J. A.; Su, Y.; Su, J.; Zhang, H.; Cheng, H.; Lu, B.; Yu, C.; Chuang, C.; Kim, T. I.; Song, T.; Shigeta, K.; Kang, S.; Dagdeviren, C.; Petrov, I.; Braun, P. V.; Huang, Y.; Paik, U.; Rogers, R. A. Nat. Commun. 2013, 1543.
Jost, K.; Perez, C. R.; McDonough, J. K.; Presser, V.; Heon, M.; Dion, G.; Gogotsi, Y. Energy Environ. Sci. 2011, 5060-5067.
Sun, C.; Zhu, H.; Baker, E. B., III; Okada, M.; Wan, J.; Ghemes, A.; Inoue, Y.; Hu, L.; Wang, Y. Nano Energy 2013, DOI: 10.1016/j.nanoen.2013.03.020.
Liu, Y.; Gorgutsa, S.; Santato, C.; Skorobogatiy, M. J. Electrochem. Soc. 2012, A349-A356.
Hu, L.; Choi, J. W.; Yang, Y.; Jeong, S.; La Mantia, F.; Cui, L. F.; Cui, Y. Proc. Natl. Acad. Sci. U.S.A. 2009, 21490.
Hu, L.; Wu, H.; La Mantia, F.; Yang, Y.; Cui, Y. ACS Nano 2011, 5843-5848.
Gui, Z.; Zhu, H.; Gillette, E.; Han, X.; Rubloff, G. W.; Hu, L.; Lee, S. B. ACS Nano 2013, 6037-6046.
Kang, Y. J.; Chun, S. J.; Lee, S. S.; Kim, B. Y.; Kim, J. H.; Chung, H.; Lee, S. Y.; Kim, W. ACS Nano 2012, 6400-6406.
Kang, Y. R.; Li, Y. L.; Hou, F.; Wen, Y. Y.; Su, D. Nanoscale 2012, 3248-3253.
Weng, Z.; Su, Y.; Wang, D. W.; Li, F.; Du, J.; Cheng, H. M. Adv. Energy Mater. 2011, 917-922.
Zheng, G.; Hu, L.; Wu, H.; Xie, X.; Cui, Y. Energy Environ. Sci. 2011, 3368-3371.
Chen, P.; Chen, H.; Qiu, J.; Zhou, C. Nano Res. 2010, 594-601.
Zhong, Q.; Zhong, J.; Hu, B.; Hu, Q.; Zhou, J.; Wang, Z. L. Energy Environ. Sci. 2013, 1779-1784.
Fan, K.; Peng, T.; Chen, J.; Zhang, X.; Li, R. J. Mater. Chem. 2012, 16121-16126.
Zhang, L.; Zhou, M.; Wen, D.; Bai, L.; Lou, B.; Dong, S. Biosens. Bioelectron. 2012, 155-159.
Xie, X.; Pasta, M.; Hu, L.; Yang, Y.; McDonough, Y.; Cha, J.; Griddle, C. S.; Cui, Y. Energy Environ. Sci. 2011, 1293-1297.
Gardner, J. P.; Mather, J. C.; Clampin, M.; Doyon, R.; Greenhouse, M. A.; Hammel, H. B.; Hutchings, J. B.; Jakobsen, P.; Lilly, S. J.; Long, K. S.; Lunine, J. I.; McCaughrean, M. J.; Mountain, M.; Nella, J.; Rieke, G. H.; Rieke, M. J.; Rix, H. W.; Smith, E. P.; Sonneborn, G.; Stiavelli, M.; Stockman, H. S.; Windhorst, R. A.; Wright, G. S. Space Sci. Rev. 2006, 485-606.
Ahn, B. Y.; Shoji, D.; Hansen, C. J.; Hong, E.; Dunand, D. C.; Lewis, J. A. Adv. Mater. 2010, 2251-2254.
Wei, Z. Y.; Guo, Z. V.; Dudte, L.; Liang, H. Y.; Mandevan, L. Phys. Rev. Lett. 2013, 215501.
Schenk, M.; Guest, S. D. Proc. Natl. Acad. Sci. U.S.A. 2013, 3276.
An, B.; Benbemou, N.; Demaine, E. D.; Rus, D. Robotica 2011, 87-102. Nano Letters Letter 4973 dx.doi.org/10.1021/nl4030374 | Nano Lett. 2013, 13, 4969-4974.
Wang, C.; Nosaka, T.; Yost, B.; Zimmerman, B.; Sutton, E. D.; Kincaid, E.; Keberle, K.; Iqbal, Q. A.; Mendez, R.; Markowitz, S.; Liu, P.; Alford, T. L.; Chan, C. K.; Chan, K. S.; O'Connell, M. J. Mater. Res. Lett. 2013, 13-18.
Hawkes, E.; An, B.; Benbernou, N. M.; Tanaka, H.; Kim, S.; Demaine, E. D.; Rus, D.; Wood, R. J. Proc. Natl. Acad. Sci. U.S.A. 2010, 12441-12445.
Onal, C. D.; Wood, R. J.; Rus, D. IEEE Int. Conf. Rob. Autom. 2011, 4608-4613.
Paik, J. K. IEEE/RSJ Int. Conf. Intell. Robots Syst. 2011, 414-420.
Miura, K. Map fold a la miura style, its physical characteristics and application to the space science. In Research of Pattern Formation; Takaki, R., Ed.; KTK Scientific Publishers: Tokyo, 1994; pp. 77-90.
Nishiyama, Y. Int. J. Pure Appl. Math. 2012, 269-279.
Miura, K. Method of packaging and deployment of large membranes in space; Technical Report for the Institute of Space and Astronautical Science. Report No. 618, Dec. 1985.
Gaynor, J. F.; Senkevich, J. J.; Desu, S. B. J. Mater. Res. 1996, 1842-1850.
John, J.; Li, Y.; Zhang, J.; Loeb, J. A.; Xu, Y. J. Micromech. Microeng. 2011, 105011.
Kim, E.; Tu, H.; Lv, C.; Jiang, H.; Yu, H.; Xu, Y. Appl. Phys. Lett. 2013, 033506.
Katragadda, R. B.; Xu, Y. Sens. Actuators, A 2008, 169-174.
Lunnon, W. F. Math. Comp. 1968, 192-199.
Demaine, E. D.; O'Rourke, J. A survey of folding and unfolding in computational geometry. In Combinatorial and computational geometry; Goodman, J. E., Pach, J., Welzl, E., Eds.; Mathematical Sciences Research Institute Publications: Cambridge University Press: New York, 2005; pp. 167-211.
Balkom, D. J.; Mason, M. T. Int. J. Robot. Res. 2008, 613-627.
Song, Z. et al. 'Origami Lithium-ion batteries'. Nature Communications. Jan. 28, 2014. vol. 5. Article No. 3140. pp. 1-6.
Long, J. W. et al. 'Three-dimensional battery architectures'. Chemical Reviews. 2004. vol. 104. No. 10. pp. 4463-4492.
Chen Y, Au J, Kazlas P, Ritenour A, Gates H, McCreary M. Flexible active-matrix electronic ink display. Nature 423, 136-136 (2003).
Gelinck GH, et al. Flexible active-matrix displays and shift registers based on solution-processed organic transistors. Nat Mater 3, 106-110 (2004).
Kim S, et al. Low-Power Flexible Organic Light-Emitting Diode Display Device. Adv Mater 23, 3511-+ (2011).
Yoon B, Ham DY, Yarimaga O, An H, Lee CW, Kim JM. Inkjet Printing of Conjugated Polymer Precursors on Paper Substrates for Calorimetric Sensing and Flexible Electrothermochromic Display. Adv Mater 23, 5492-+ (2011).
Kim DH, et al. Stretchable and foldable silicon integrated circuits. Science 320, 507-511 (2008).
Ko HC, et al. A hemispherical electronic eye camera based on compressible silicon optoelectronics. Nature 454, 748-753 (2008).
Kim DH, et al. Epidermal Electronics. Science 333, 838-843 (2011).

(56) References Cited

OTHER PUBLICATIONS

Pushparaj VL, et al. Flexible energy storage devices based on nanocomposite paper. Proc Natl Acad Sci U S A 104, 13574-13577 (2007).
Scrosati B. Nanomaterials—Paper powers battery breakthrough. Nat Nanotechnol 2, 598-599 (2007).
Gao KZ, et al. Paper-based transparent flexible thin film supercapacitors. Nanoscale 5, 5307-5311 (2013).
Wang JZ, et al. Highly flexible and bendable free-standing thin film polymer for battery application. Mater Lett 63, 2352-2354 (2009).
Hu LB, Wu H, La Mantia F, Yang YA, Cui Y. Thin, Flexible Secondary Li-Ion Paper Batteries. ACS Nano 4, 5843-5848 (2010).
Ihlefeld JF, Clem PG, Doyle BL, Kotula PG, Fenton KR, Apblett CA. Fast Lithium-Ion Conducting Thin-Film Electrolytes Integrated Directly on Flexible Substrates for High-Power Solid-State Batteries. Adv Mater 23, 5663-+ (2011).
Koo M, et al. Bendable Inorganic Thin-Film Battery for Fully Flexible Electronic Systems. Nano Lett 12, 4810-4816 (2012).
Yu CJ, Masarapu C, Rong JP, Wei BQ, Jiang HQ. Stretchable Supercapacitors Based on Buckled Single-Walled Carbon Nanotube Macrofilms. Advanced Materials 21, 4793-+ (2009).
Li X, Gu TL, Wei BQ. Dynamic and Galvanic Stability of Stretchable Supercapacitors. Nano Lett 12, 6366-6371 (2012).
Hu LB, et al. Stretchable, Porous, and Conductive Energy Textiles. Nano Lett 10, 708-714 (2010).
Kuribayashi K, et al. Self-deployable origami stent grafts as a biomedical application of Ni-rich TiNi shape memory alloy foil. Mater Sci Eng A-Struct Mater Prop Microstruct Process 419, 131-137 (2006).
Belcastro S-M, Hull TC. Modeling the folding of paper into three dimensions using affine transformations. Linear Algebra and its Applications 348, 273-282 (2002).
PCT/US2014/072354 International Search Report and Written Opinion of the International Searching Authority dated Apr. 13, 2015 (15 pages).
PCT/US2014/011710 International Search Report and Written Opinion of the International Searching Authority dated May 12, 2014 (7 pages).
PCT/US2015/059006 International Search Report and Written Opinion of the International Searching Authority dated Feb. 17, 2016 (7 pages).
Sant et al., "An in situ heater for a phase-change-material-based actuation system," J. Micromech. Microeng. 2. 085-39 (2010).
Yang et al., "A latchable microvalve using phase change of paraffin wax," Sensors and Actuators A 134, pp. 194-200 (2007).

* cited by examiner

Origami battery unfolded unfolded folded folded

DEFORMABLE ORIGAMI BATTERIES

This application claims the priority of U.S. Provisional Patent Application No. 61/921,316, filed Dec. 27, 2013, which is incorporated herein by reference.

FIELD OF THE INVENTION

The present invention relates to a flexible and stretchable battery and a method for producing the same.

BACKGROUND

Deformable energy storage devices are emerging as indispensable components for unconventional electronics devices that are able to survive significant degrees of deformation, mainly bending and stretching, with strain levels much greater than 1%. Examples include flexible displays, stretchable circuits, hemispherical electronic eyes, and epidermal electronics. The energy storage devices present a significant challenge for developing a robust deferrable system, since they must be seamlessly integrated with deformable functional devices and energy supplies with similar mechanical characteristics, including linear deform ability (i.e., stretchability and compressibility), bendability, and twistability. For bending deformation, thin film based energy solutions such as supercapacitors and batteries have been developed that take advantage of the inherently small strains (usually less than 1%) near the mechanical neutral planes.

Recently, progress has been made in the development of stretchable energy sources. Stretchable supercapacitors using buckled carbon nanotube (CNT) macrofilms as electrodes and CNT-coated porous conductive textiles have been developed, as well as stretchable lithium-ion batteries (LIBs). However, approaches that simultaneously achieve a high level of deformability (including linear stretching and compression, bending, twisting and combinations thereof) with large areal coverage that are compatible with commercially available manufacturing technologies are lacking.

Therefore, there remains a need for flexible and stretchable batteries that remains functional, and can be integrated with electronic devices.

SUMMARY OF THE INVENTION

The origami lithium-ion batteries (LIBs) described herein can be deformed at a high level, including folding, bending and twisting. Deformability at the system level is enabled using rigid origami, which prescribes a crease pattern such that the materials making the origami pattern do not experience large strain. The origami battery is fabricated through slurry coating of electrodes onto paper current collectors, packaging in standard materials, followed by folding using the Miura pattern. The resulting origami battery achieves significant linear and areal deformability, large twistability, and bendability.

Accordingly, an object of the present invention is to provide a flexible and stretchable battery that contains rigid origami folds. Preferably, the rigid origami folds form a Miura folding pattern that enables the battery to be flexible and to achieve significant deformity. "Miura pattern," "Miura folding", or the like, is used herein to indicate a well-known folding method for a flat sheet into a smaller area by dividing the flat sheet into parallelograms with interdependent folds.

Another object of the present invention is to provide methods for making a flexible and deformable battery. The methods involve providing and packaging a battery in a flat planar form, and folding the battery into a Miura pattern. In its final folded form, the battery has high flexibility and can be significantly deformed without losing its functionality.

A further object of the present invention is to provide an electronic device containing the flexible and deformable battery. The device can be, for example, a smart watch, a smart arm band, a smart wrist lace, a smart head band, and so on.

BRIEF DESCRIPTION OF THE DRAWINGS

FIGS. 4E and 4G show the entire region of the crease. Scale bars in FIGS. 4A, 4D, and 4F are 2 mm. Scale bars in FIGS. 4B, 4E, and 4G are 100 µm. The scale bar in FIG. 4C is 2 cm.

FIGS. 20A and 20B show optical and scanning electron micrographs (SEM), respectively, of $Li_4Ti_5O_{12}$ (LTO) electrodes in the region of a crease as indicated by the dashed lines. FIGS. 20C and 20D show optical and SEM images, respectively, of $LiCoO_2$ (ECO) electrodes in the region of a crease as indicated by the dashed lines. FIGS. 20B and 20D show the entire region of the crease for the origami LIBs. Scale bars in FIGS. 20A and 20C are 2 mm. Scale bars in FIGS. 20B and 20D are 100 μm.

FIGS. 22A and 22B show optical and SEM images, respectively, of graphite electrodes on a Cu current collector in a region of a crease as indicated by the dashed lines. FIGS. 22C and 22D show optical and SEM images, respectively, of LCO electrodes on an Al current collector in a region of a crease as indicated by the dashed lines. FIGS. 22B and 22D show the entire region of the crease. Scale bars in FIGS. 22A and 22C are 2 mm. Scale bars in FIGS. 22B and 22D are 100 μm.

DETAILED DESCRIPTION

Figure 1:
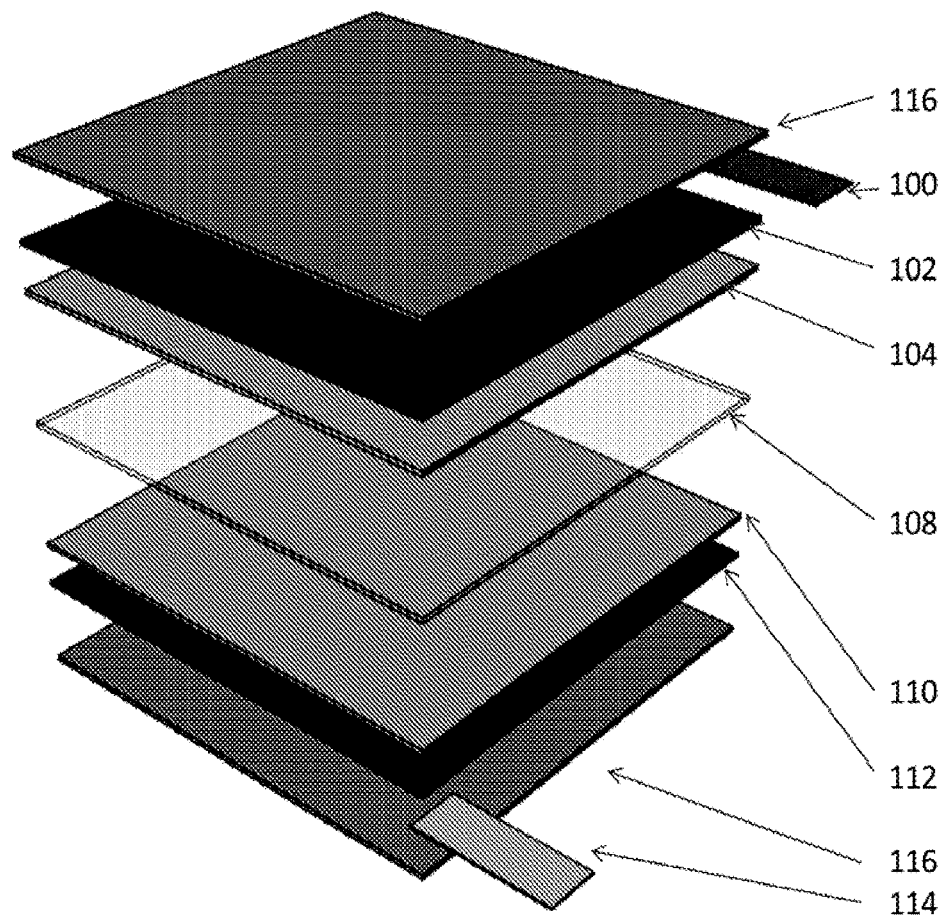
FIG. 1 is an exploded view of the multilayer structure of conventional LIBs in the planar state.

FIG. 1 shows a flat planar schematic of the battery of the present invention. The battery illustrated in the figure includes sheet-like slacking of several layers including: an anode current collector 102 in electrical connection with an anode electrode lead 100, an anode electrode 104, a separator 108, a cathode electrode 110, and a cathode current collector 112 in electrical connection with a cathode electrode 114. Essentially, the separator 108 separates the anode side of the battery from the cathode side of the battery, A packaging material 116 is used to hermetically seal the stacking layers. The anode 100 and cathode 114 electrode leads contain portions that extend outside of the packaging. Those extended portions function as a negative electrode terminal and a positive electrode terminal. The shape of the battery pack may be flat-plate like or curved-plate like. The thickness of the whole battery pack is less than about 10 mm, preferably from about 100 μm to 3 mm.

Sheet-like electrodes suitable for a thin battery are preferably used in the present invention. The plane shape of the electrode is not particularly limited, but is preferably circular, elliptical, belt-like, rectangular, or approximately rectangular. An "approximately rectangular" shape is, for example, a rectangular shape with four corners chamfered, or a rectangular shape with four corners rounded into arcs.

The anode side of the battery includes a negative electrode current collector 102 and an anode electrode 104 material layer adhering to one surface or both surfaces of the anode current collector, or the stack of multiple combinations of collector and electrode material layer. The anode electrode 104 layer may be formed by: press-fitting or vapor-depositing a negative electrode active material to or on the negative electrode current collector, or alternatively, applying a material mixture including a negative electrode active material onto the anode current collector; and then rolling.

The anode electrode 104 material may be selected as appropriate from known materials and compositions. For example, a lithium-based negative electrode, various natural and artificial graphites, a silicide, a silicon oxide, or various alloy materials may be used to produce a thin battery with high energy density.

In the case of a lithium-based anode electrode, the anode electrode 104 layer may be a lithium metal layer or a lithium alloy layer, which has a high capacity. Examples of the lithium alloy include Li—Si alloy, Li—Sn alloy, Li—Al alloy, Li—Ga alloy, Li—Mg alloy, and Li—In alloy. In view of improving the negative electrode capacity, the content of elements other than Li in the lithium alloy is preferably 0.1 to 10 mass %. In a preferred embodiment, the anode electrode 104 contains $Li_4Ti_5O_{12}$ (LTD), carbon nanotubes (CNT) and PVDF (polyvinylidene difluoride) coated on paper. Here the PVDF is used as a binder.

The anode current collector 102 may be a metal foil, such as an electrolytic metal foil obtained by electrolysis or a rolled metal foil obtained by rolling. The electrolytic metal foil is obtained, for example, by immersing a drum (simulating an electrode) in an electrolytic bath containing a predetermined metal ion, passing a current through the drum while being rotated to deposit a predetermined metal on the surface of the drum, and separating the deposited metal from, the drum. The electrolysis process is advantageous for excellent mass-productivity, and comparatively low production cost. The rolling process is advantageous for easy production of a thin metal foil, and weight reduction. The rolled metal foil, in which the crystals are oriented in the rolling direction, is excellent in bending resistance, and is suitably used for a thin battery. In a preferred embodiment, the anode current collector 102 may be a paper coated with carbon nanotube/PVDF. Here, the PVDF is used as a binder.

The cathode side of the battery includes a cathode electrode current collector 112 and a cathode electrode 110 adhering to one surface or both surfaces of the cathode current collector, or a stack of multiple combinations of collector and electrode material. The cathode electrode 110 layer is preferably formed by: vapor-depositing a positive electrode active material on the cathode current collector, or alternatively, applying a material mixture including a cathode electrode material onto the cathode current collector; and then rolling. The cathode electrode 110 material mixture may further include a binder in addition to a cathode electrode material and further includes a conductive agent, as needed.

Examples of the cathode electrode 110 material include manganese dioxide; fluorinated carbons; organic or inorganic sulfides; lithium-containing composite oxides; metal oxides such as vanadium oxide or niobium oxide, or lithiated products thereof; conjugated organic polymer with conductivity; Chevrel-phase compounds; and olivine-type compounds. Preferred among them, are manganese dioxide, fluorinated carbons, sulfides, and lithium-containing composite oxides, and particularly preferred is manganese dioxide.

Given that the reaction of manganese dioxide in the battery is a one-electron reaction, the theoretical capacity per mass of the positive electrode active material is 308 mAh/g, which is a high capacity. In addition, manganese dioxide is inexpensive. A particularly preferred manganese dioxide is electrolytic manganese dioxide because it is easily available. Manganese dioxide may contain a very small amount of impurities which have inevitably entered in the production process. The positive electrode active material may be a mixture which is mainly composed of manganese dioxide and contains a material other than manganese dioxide, such as a fluorinated carbon, vanadium oxide, or olivine-type compound.

Examples of the fluctuated carbons include fluorinated graphite represented by $(CF_w)_m$, where m is an integer of one or more, and $0<w\leq1$. Examples of the sulfides include $TiS_2$, $MoS_2$, and $FeS_2$. Examples of the lithium-containing composite oxides include $Li_{xa}CoO_2$, $LiNiO_2$, $Li_{xa}MnO_2$, $Li_{xa}Co_yNi_{1-y}O_2$, $Li_{xa}Ni_{1-y}M_yO_z$, $Li_{xb}Mn_2O_4$, and $Li_{xb}Mn_{2-y}M_yO_4$. In the above formulae, M is at least one selected from the group consisting of Na, Mg, Se, Y, Mn, Fe, Co, Ni, Cu, Zn, Al, Cr, Pb, Sb, and B; xa=0 to 1.2; xb=0 to 2; y=0 to 0.9; and z=2 to 2.3. The values of xa and xb are values before the start of charge and discharge, and increase and decrease during charge and discharge.

Examples of the conductive agent include graphites, such as natural graphite and artificial graphite; carbon blacks, such as acetylene black, Ketjen black, channel black, furnace black, lamp black, and thermal black; conductive fibers, such as carbon fiber and metallic fiber; metal powders, such as aluminum powder; conductive whiskers, such as zinc oxide whisker and potassium titanate whisker; conductive metal oxides, such as titanium oxide; and organic conductive materials, such as a phenylene derivative. The conductive agents may be used singly or in combination of two or more. In view of improving the conductivity of the cathode electrode layer and ensuring the positive electrode capacity, the content of the conductive agent in the positive electrode active material layer is preferably 1 to 30 parts by mass per 100 parts by mass of the positive electrode active material.

Examples of the blinder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, hexafluoropolypropylene, styrene-butadiene rubber, and carboxymethyl cellulose, the binders may be used singly or in combination of two or more. In view of improving the bonding property of the cathode electrode and ensuring the cathode electrode capacity, the content of the binder in the positive electrode active material layer is preferably 1 to 15 parts by mass per 100 parts by mass of the positive electrode active material.

The binder may be a polymer electrolyte. The presence of a polymer electrolyte in the cathode electrode layer facilitates diffusion of lithium ions, allowing for smooth transfer of lithium ions between the cathode current collector and the cathode electrode. The polymer electrolyte may be used singly as a binder, or in combination with another binder.

In a preferred embodiment, the cathode electrode 110 contains $LiCoO_2$ (LCD), carbon nanotubes (CNT) and PVDF coated on paper. Here the PVDF is used as a binder.

The cathode current collector 112 may be, for example, a metal film, a metal foil, and a non-woven fabric made of a metal, fiber. Examples of a metal material constituting the cathode current collector 112 include carbon, nanotubes, silver, nickel, palladium, gold, platinum, aluminum, aluminum alloy, and stainless steel. One of them may singly constitute the current collector, or a combination of two or more of them may constitute the current collector. In a preferred embodiment, the cathode current collector 112 may be a paper coated with carbon nanotube/PVDP.

The packaging material 116 is preferably composed of a highly flexible material with excellent flex resistance (e.g., a film-like material). Preferably, the packaging material 116 is composed of a laminated film, which includes a water-vapor barrier layer and a resin layer provided on one surface or both surfaces of the barrier layer. The barrier layer is preferably a metal layer or a ceramics layer.

The metal layer is preferably made of aluminum, titanium, nickel stainless steel gold, or silver for strength and bending resistance. The ceramic layer is preferably made of silicon oxide, magnesium oxide, or aluminum oxide. Among them, aluminum, aluminum oxide, and silicon oxide are particularly preferred due their low production cost and excellent barrier property.

The thickness of the barrier layer is preferably 10 to 70 μm. The thickness of the resin layer, both on the inside and the outside of the housing, is preferably 20 to 80 μm. The thickness of the laminated film is preferably 30 to 150 μm. By using a laminated film having such a thickness, it is possible to reduce the thickness of the thin battery, while ensuring the strength and flexibility of the packaging material.

In view of the strength, impact resistance, and electrolyte resistance, the resin layer on the inside of the packaging is preferably made of for example, polyolefin such as polyethylene (PE) or polypropylene (PP), a modified product thereof polyethylene terephthalate (PET), polybutylene terephthalate (PBT), polyamide, polyurethane, polyethylene-vinyl acetate copolymer (EVA), or an ionomer resin.

In view of the strength, impact resistance, and chemical resistance, the resin layer on the outside of the packaging material lib is preferably made of, for example, polyamide (PA) such as 6,6-nylon or 6-nylon, or polyester such as PET or PBT.

Preferably, the packaging material 116 may be made of for example, an acid-modified-PP/PET/Al/PET laminated film, an acid-modified-PE/PA/Al/PET laminated film, an ionomer-resin/Ni/PE/PET laminated Him, an EVA/PE/Al/PET laminated film, or an ionomer-resin/PET/Al/PET laminated film. The Al layer and Ni layer may be replaced with a ceramics layer such as an $Al_2O_3$ layer or $SiO_2$ layer. In a preferred embodiment, the packaging material 116 is a monochlorosubstituted poly(para-xylylene) which is commercially as Parylene-C.

The separator layer 108 has a function of separating the anode side from the cathode side of the battery, and contains an electrolyte that allows for ion migration. The electrolyte may be liquid, gel or solid, A non-aqueous electrolyte is most preferred because if has a wide potential window. The separator layer 108 may contain any component in addition to the electrolyte, as long as the purpose thereof is not impaired. For example, for the purpose of Improving the strength, homogeneity, and ion conductivity of the electrolyte, a filler such as inorganic particles or resin particles may be added to the electrolyte. Examples of the inorganic particles include alumina fine particles and silica fine particles.

The separator 108 preferably has ion permeability, as well as excellent mechanical strength and insulating property. Examples of a material for such a separator include polypropylene, polyethylene, cellulose, polyethylene terephthalate, polyphenylene sulfide, polyamide, and polyimide. A preferred oriented sheet is a microporous film containing either polypropylene or polyethylene, or both. A separator 108 including such a microporous film and a highly heat resistant layer of polyamide or the like laminated thereon has a shutdown function, and is excellent in short-circuit resistance.

A liquid electrolyte may be a solution comprising a solvent and a solute (a supporting salt) dissolving in the solvent, and further comprising various additives, if necessary.

A gel electrolyte (a gel polymer electrolyte) is generally a gel containing a liquid electrolyte and a polymer material therewith serving as a matrix. The gel polymer electrolyte may be any polymer material that can be gelled by absorbing a liquid electrolyte. Examples of such a polymer material include: poly(meth)acrylate polymers having an ester unit, such as silicone, acrylic acid, acrylic acid ester, methacrylic acid, or methacrylic acid ester, as a principal component (e.g., 90 mol % or more); polyacrylonitrile; polyphosphate; polyethylene oxide; polypropylene oxide; and fluorine polymer. These polymer materials may be used singly or as a mixture or composite of two or more. Furthermore, these polymer materials may be cross-linked or modified, as appropriate.

Among the above-exemplified polymer materials, a fluorine polymer, in particular, is highly resistive to oxidation and reduction, and thus is suitable for allowing a liquid non-aqueous electrolyte to be absorbed therein. It is preferable to use, for example, polyvinylidene fluoride, vinylidene fluoride-hexafluoropropylene copolymer, vinylidene fluoride-trifluoroethylene copolymer, or vinylidene fluoride-tetrafluoroethylene copolymer, singly or as a mixture of two or more.

A solid electrolyte may be a powder or deposited film of various inorganic solid electrolytes, or a dry polymer electrolyte. Examples of the inorganic solid electrolytes include: lithium halides such as lithium iodide, and derivatives thereof; lithium nitride; oxyacid salt-based materials; and sulfide-based materials. The dry polymer electrolyte is a polymer material with a solute (supporting salt) added thereto, and is free of solvent.

Examples of the polymer material serving as a matrix of the dry polymer electrolyte include: ether polymers such as polyethylene oxide, and cross-linked products thereof and poly(meth)acrylate polymers. These may be a polymer of one monomer, or a copolymer of two or more monomers. These polymer materials may be used singly or as a mixture or composite of two or more.

Among the above examples, a separator containing a dry polymer electrolyte or gel polymer electrolyte is preferred, in view of preventing the electrolyte components from leaking outside in the event the packaging is damaged. Various fillers may be added to the dry polymer electrolyte or gel polymer electrolyte. Alternatively, the dry polymer electrolyte or gel polymer electrolyte is impregnated into or allowed to adhere to the separator serving as a support, to form an electrolyte layer.

When a dry polymer electrolyte or gel polymer electrolyte is used, it may not be necessary to provide a means for preventing the leakage of electrolyte. Therefore, it is possible to easily make the thin battery smaller in size, lighter in weight, and further thinner in thickness. Furthermore, by using a dry polymer electrolyte or gel polymer electrolyte, the separator layer becomes amenable to bending. As such, the adhesion between the electrodes may be further improved, and variations and deterioration of the battery performance are significantly suppressed even after repeated bending.

To construct the battery of the present invention, first, a rigid origami folding pattern, e.g. a Miura folding pattern, is determined. The separator, anode side, and cathode side of the battery are prepared and then assembled and sealed inside the packaging material 116. The battery is then folded according to a Miura pattern. In the folded configuration, the battery is highly stretchable and deformable due to the Miura folding.

Without further description, it is believed that one of ordinary skill in the art can, using the preceding description and the following illustrative examples, snake and utilise the present invention. The following examples are given to illustrate the present invention. It should be understood that the invention is not to be limited to the specific conditions or details described in the examples.

Example 1

Battery Design Using Miura Folding.

Figure 2A:
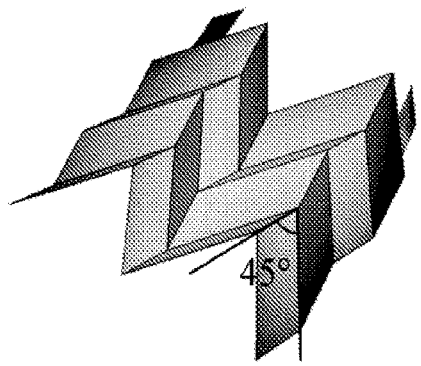
FIG. 2A depicts an example of an unfolded origami LIB using 45° Miura folding.
Figure 3A:
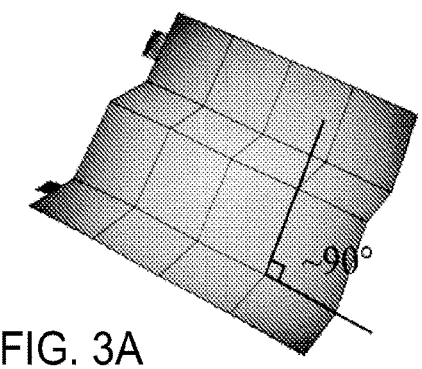
FIG. 3A depicts an example of an unfolded origami LIB using 90° Miura folding.
Figure 2B:
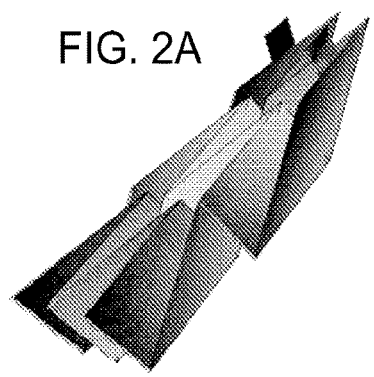
FIG. 2B depicts the origami LIB of FIG. 2A in the folded state, showing that the LIB can be substantially completely compressed in one direction.
Figure 3B:
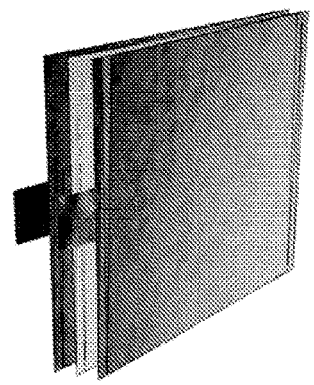
FIG. 3B depicts the origami LIB of FIG. 3A in the folded state, showing that the LIB can be substantially completely collapsed in biaxial directions.

FIG. 1 depicts a conventional planar LIB having layers including current collectors, anode and cathode, separator and packaging. Origami LIBs are formed by folding these layers based on specific origami patterns of Miura-ori, as described in Miura, Method of packaging and deployment of large membranes in space. Institute of Space and Astronomical Sciences (1985), which is incorporated by reference herein. In the Miura-ori pattern, shown in FIGS. 2A and 3A many identical parallelogram faces are connected by "mountain" and "valley" creases. Depending on the difference of angles between adjacent "mountain" and "valley" creases, the Miura-ori can be either almost completely compressible in one direction as shown in FIG. 2B, (referred to as "45° Miura folding" hereafter) or collapsible in two directions as shown in FIG. 3B (referred to as "90° Miura folding" hereafter). Despite the overall high-level of deformability that can be realized, the parallelogram faces themselves remain undeformed because the folding and unfolding of the creases maintains the faces in a rigid configuration. This class of origami pattern is appropriately called rigid origami, where deformability at the system-level is prescribed by the creases while the base or substrate materials making the origami pattern do not experience large strain except at the creases.

In order to achieve good foldability and electrical conductivity at the creases after cyclic folding and unfolding, carbon nanotube (CNT) coated paper is used as the current collectors upon which active material layers are deposited, as described in Example 2.

Figure 4A:
FIGS. 4A and 4B show optical and scanning electron micrographs (SEM), respectively, of carbon nanotube (CNT)-coated paper current collectors.
Figure 4B:
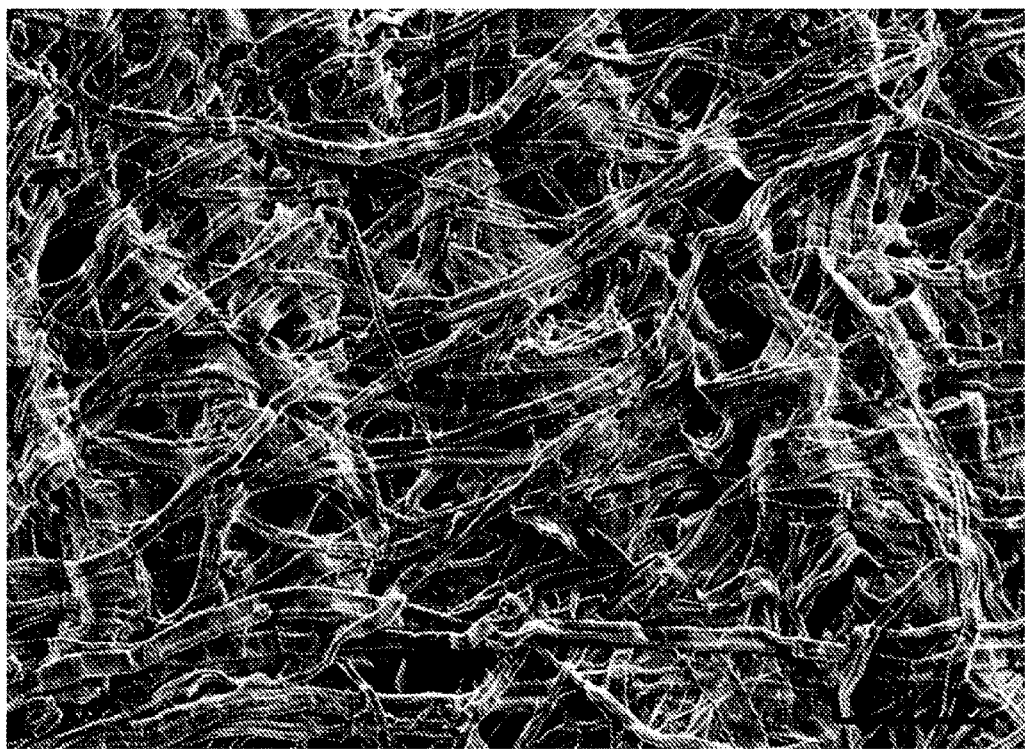

FIGS. 4A and 4B show optical and scanning electron micrographs (SEM), respectively, of this paper current collector, which was produced by coating thin and porous laboratory Kimwipes (Kimtech Science, Kimberly-Clark) with CNT layers of ~40 μm thickness after drying. The electrical resistance of this paper current collector on each side was about 5Ω per square, LiCoO$_2$ (LCO, Sigma-Aldrich) and Li$_4$Ti$_5$O$_{12}$ (LTO, MTI Corp.) were chosen as active materials for the cathode and anode electrodes, respectively. Conventional slurries of these materials were prepared and used to coat the CNT-coated paper current collectors. The battery cell was assembled in an Argon filled glovebox using 1 M LiPF$_6$ in EC:DMC:DEC (4:2:4) (MTI Corp), polypropylene (Celgard 2500), and aluminized polyethylene (PE) (Sigma-Aldrich) as electrolyte, separator, and packaging materials, respectively.

Figure 4C:
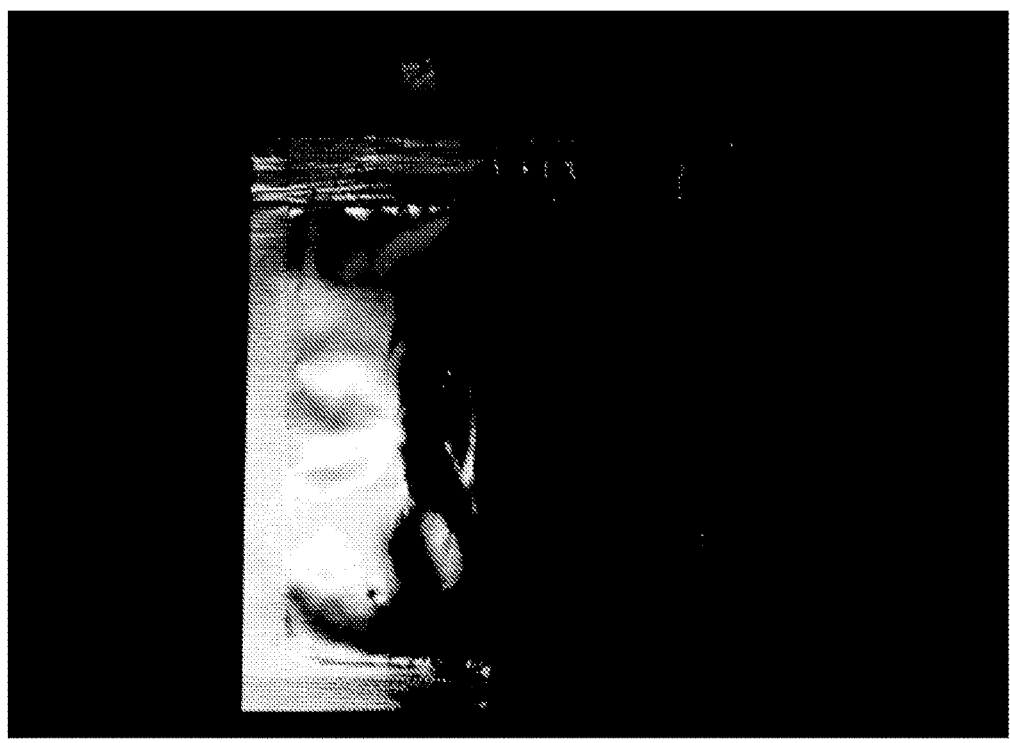
FIG. 4C is an optical image of an assembled LIB.

The assembled battery cell shown in FIG. 4C was folded using the desired origami patterns (FIGS. 2A and 3A) in an ambient environment. The thickness of the assembled LIB cell is typically in a range between 100 μm and 1000 μm or between 200 μm and 500 μm. In one example, the thickness of the assembled LIB cell is 380 μm.

As a packaging material, aluminized polyethylene allows deformation of a folded LIB since after folding, the aluminized polyethylene has certain degree of deformation that holds the folded state. In contrast, other packaging materials, such as Parylene-C, do not allow deformation of a folded LIB, because Parylene-C does not hold the folds.

Figure 4D:
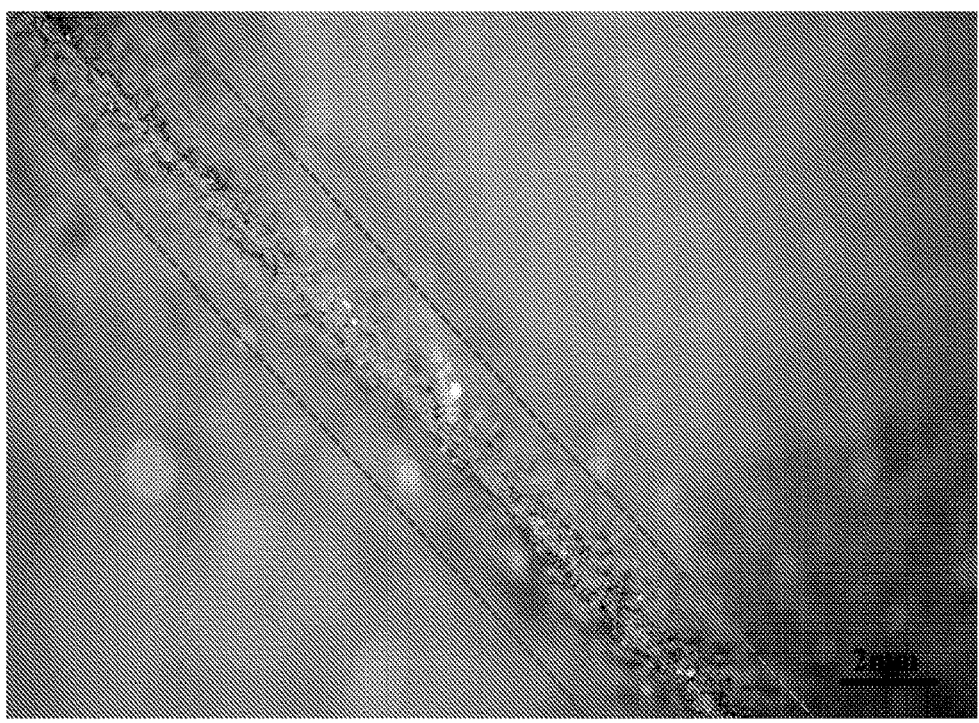
FIGS. 4D and 4E show optical and SEM images, respectively, of an as-coated $Li_4Ti_5O_{12}$ (LTO) anode electrode in a region of a crease, as indicated by the dashed lines.
Figure 4E:
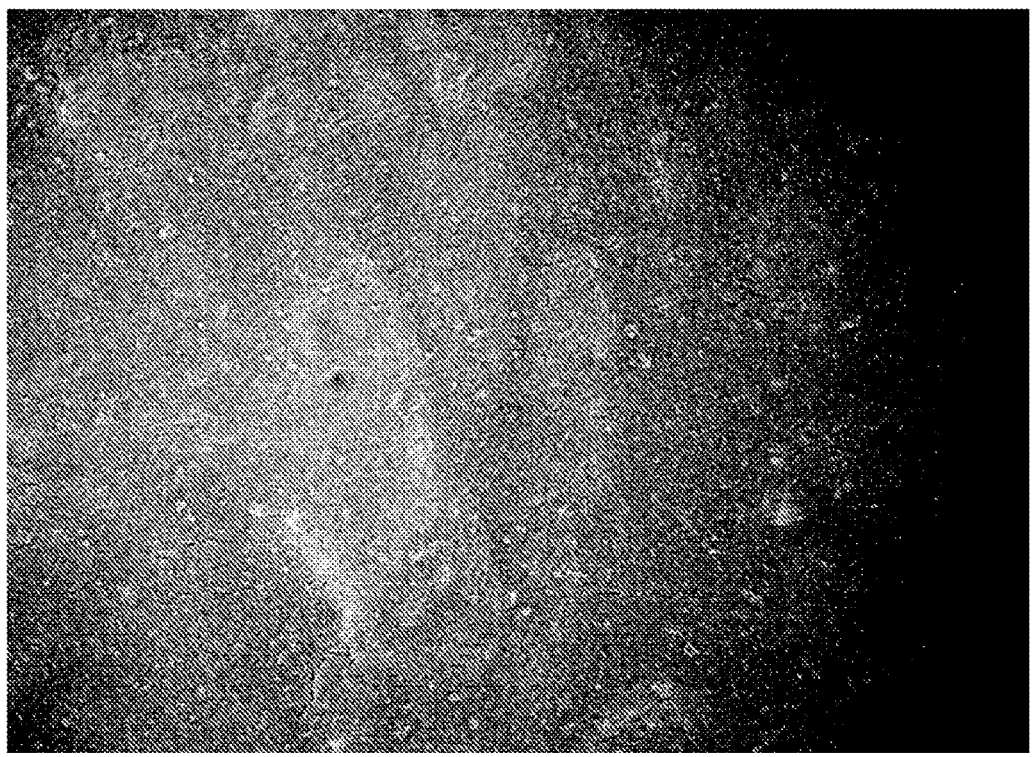
Figure 4F:
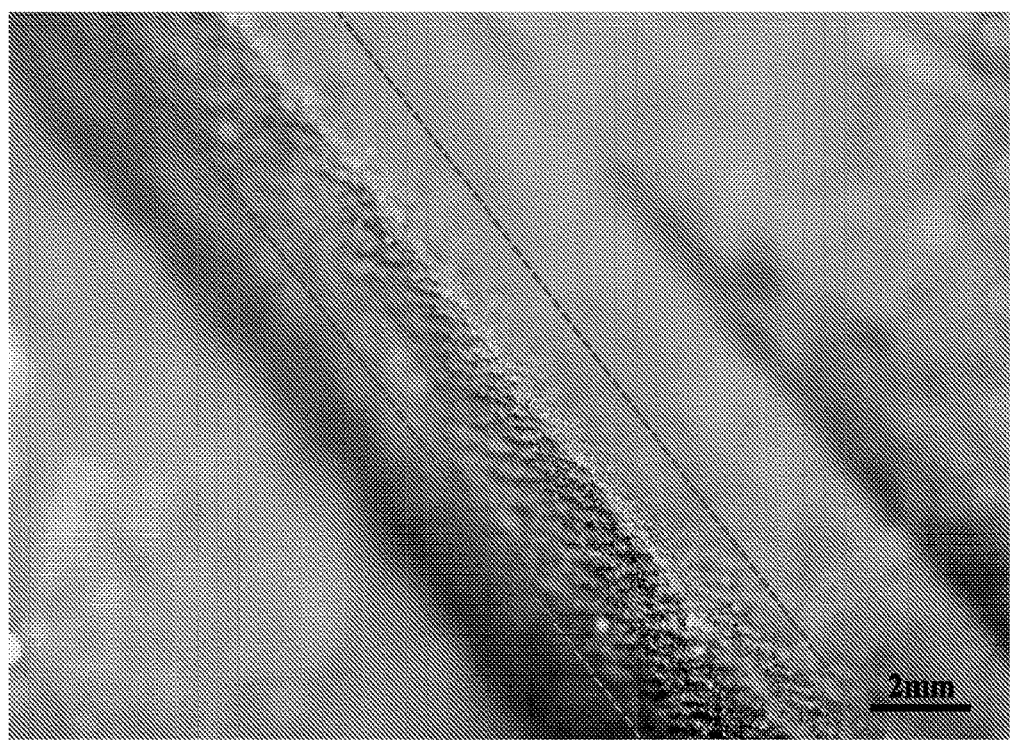
FIGS. 4F and 4G show optical and SEM images, respectively, of as-coated $LiCoO_2$ (LCO) cathode electrode in a region of a crease, as indicated by the dashed lines.
Figure 4G:
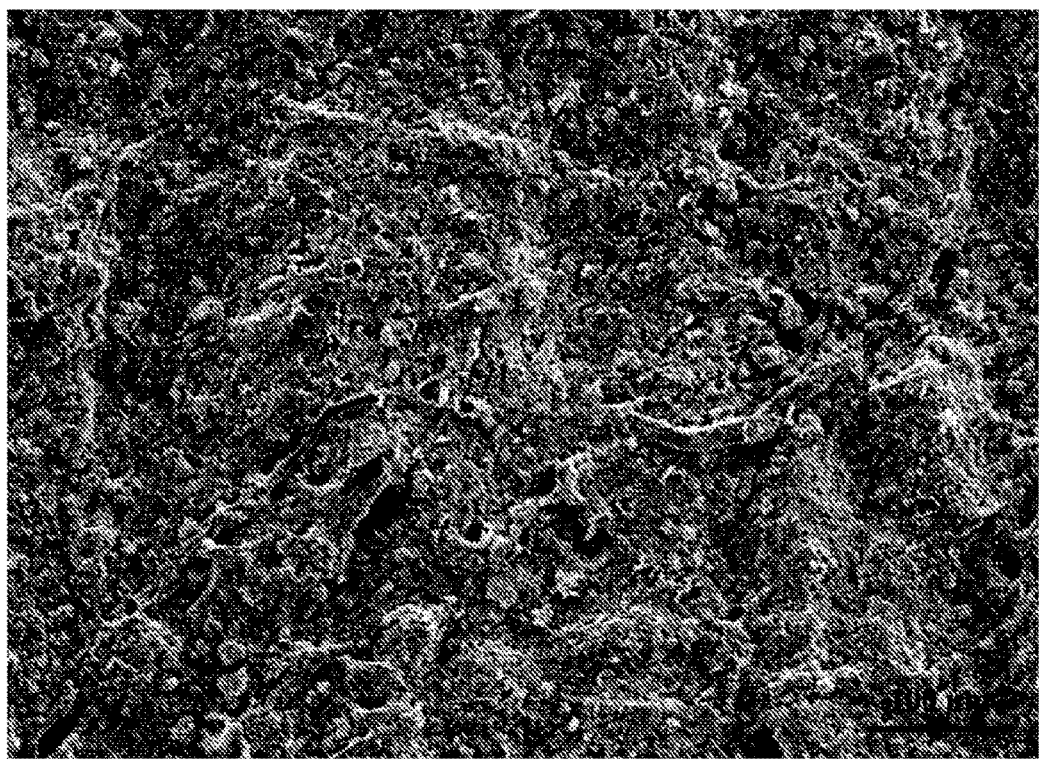

FIGS. 4D and 4E show optical and SEM images, respectively, of the as-coated anode electrode in the regions of a crease, and FIGS. 4F and 4G show optical and SEM images, respectively, of the as-coated cathode electrode in the regions of a crease, showing that there were no apparent cracks or delamination of active materials from the electrodes, as compared to the planar regions. Moreover, it was verified that the electrical resistance of the electrodes prior to and after folding in the origami pattern (without packaging) remained unchanged. Galvanostatic charge and discharge tests were performed using a battery testing unit (Arbin Instruments).

Electrochemical and Mechanical Characteristics.

Figure 5A:
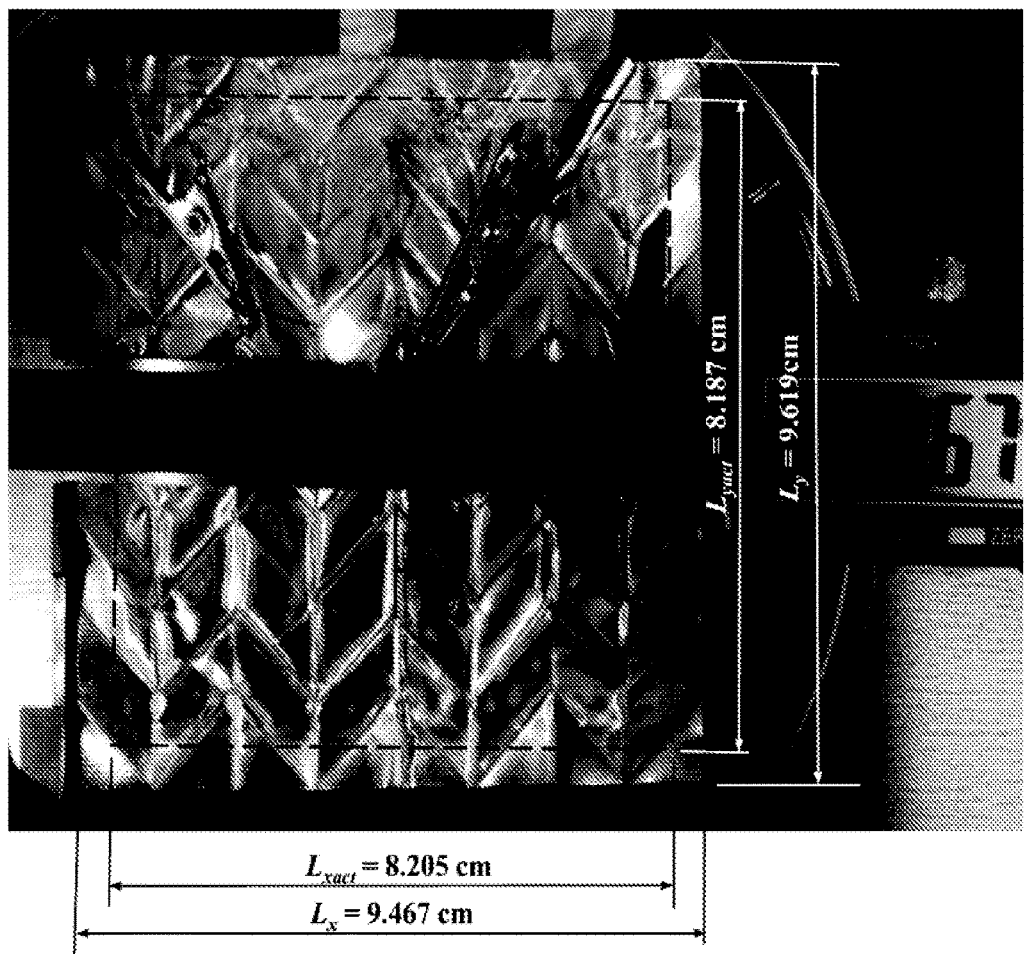
FIG. 5A is a photograph showing an origami battery in the completely unfolded state, where the battery was used to power a light-emitting diode (LED).

FIG. 5A-FIG. 11 show the results for LIBs using 45° Miura folding. FIGS. 5A and 5B are photographs of the planar and completely compressed configurations, respectively. The dotted black lines highlight the area of anode and cathode electrodes, which provide over 74% areal coverage. The size of the origami battery in FIG. 5A is $L_x \times L_y$, and the active electrodes cover an area of $L_{xact} \times L_{yact}$. The size of the battery in FIG. 5B is $l_x \times l_y$.

Figure 6:
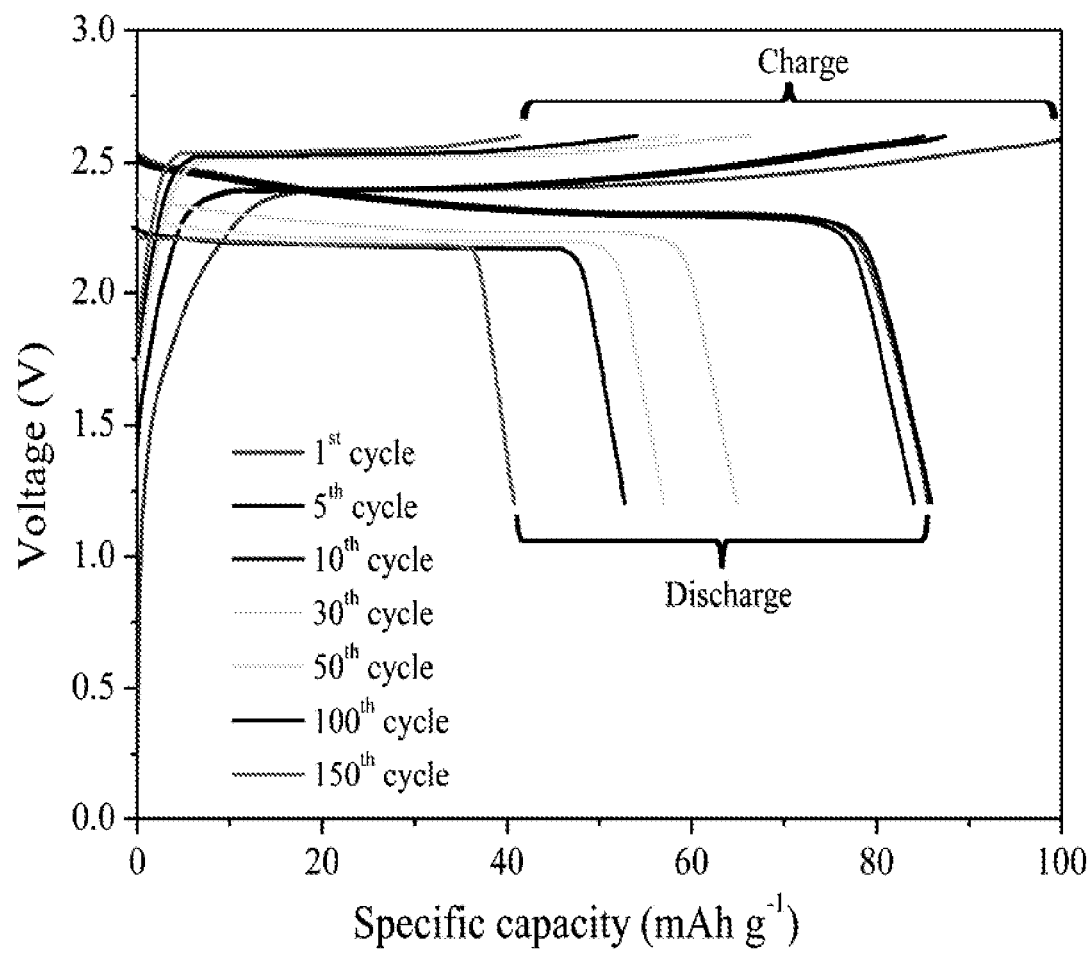
FIG. 6 shows galvanostatic charge and discharge of the origami LIBs using 45° Miura folding at the planar state ($1^{st}$, $5^{th}$, and $10^{th}$ cycles) and the completely compressed state ($30^{th}$, $50^{th}$, $100^{th}$, and $150^{th}$ cycles).

Electrochemical properties of the LIB in its planar state (for the 1$^{st}$, 5$^{th}$, and 10$^{th}$ cycles) and completely compressed state (for the 30$^{th}$, 50$^{th}$, 100$^{th}$, and 150$^{th}$ cycles) under a current density of 20 mA g$^{-1}$ are shown in FIG. 6. Well-defined plateaus at around 2.35V were observed. The mass loading of LiCoO$_2$ (LCO) (specific capacity 145 mAh g$^{-1}$) and Li$_4$Ti$_5$O$_{12}$ (LTO) (specific capacity 160 mAh g$^{-1}$) were 102 mg and 169 mg, respectively, which gave the specific capacity at its compressed configuration of 85.5 mAh g$^{-1}$ for the present current density (or equivalently C/7).

Figure 7:
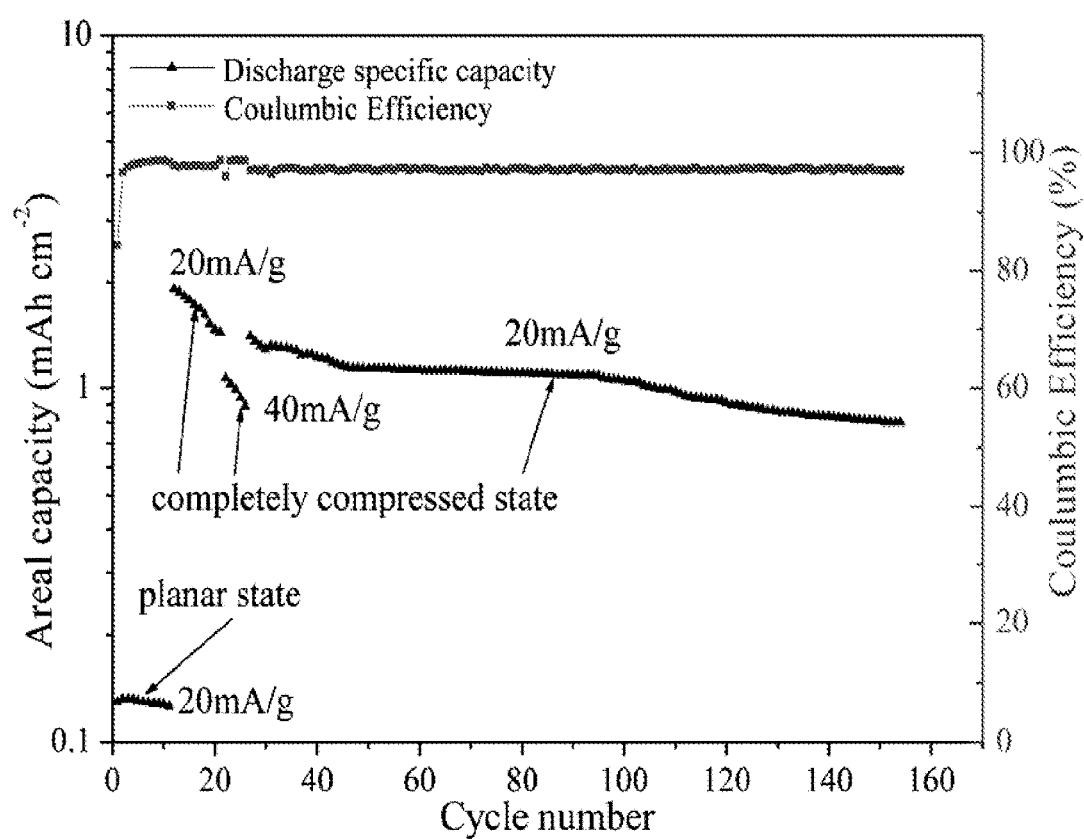
FIG. 7 shows capacity retention (left axis) and Coulombic efficiency (right axis) as a function of cycle number for two current densities (20 mA $g^{-1}$ and 40 mA $g^{-1}$).

The areal capacity for the planar and completely compressed states as a function of charge rate, shown in FIG. 7, was examined by performing galvanostatic cycling under two current densities. At a current rate of 20 mAh g$^{-1}$, the areal capacity was about 0.2 mAh cm$^{-2}$ for the first 11 cycles when the origami battery was in its planar unfolded state, and increased to 1.4-2.0 mAh cm$^{-2}$ for the next 10 cycles when the origami battery was completely compressed. When the current rate was increased to 40 mA g$^{-1}$ for the next 5 cycles, the areal capacity remained at 0.8-1.0 mAh cm$^{-2}$. When the current density was reduced back to the initial level of 20 mA g$^{-1}$, the areal capacity nearly recovered to 1.3-1.4 mAh cm$^{-2}$, and remained at above 1.0 mAh cm$^{-2}$ for up to 110 cycles, which indicates reasonably good areal capacity. Observed decrease of the capacity after many cycles (i.e., two months of continuous charging/discharging) may be attributed to factors related to leakage in the present aluminized PE packaging, which can be improved with better seals. The present areal capacity for the completely compressed state of 1.0-2.0 mAh cm$^{-2}$ could be further increased by adding more active materials (e.g., LTO and LCO) to obtain thicker electrodes. However, such a modification might reduce the rate capacity and could also lead to difficulty in folding and higher localized strain at the creases.

Figure 8:
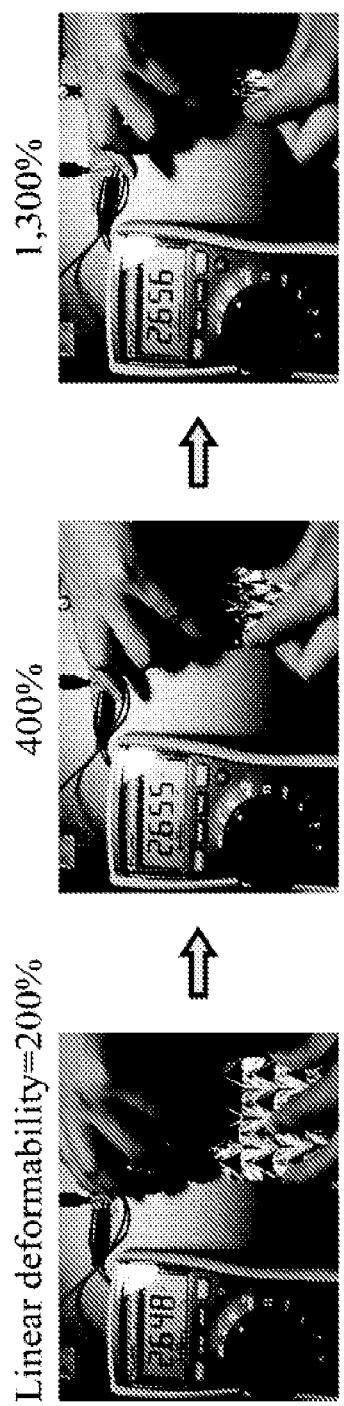
FIG. 8 shows photographs of linear deformation (i.e., folding) of an origami LIB connected to a voltmeter.

The mechanical characteristics of the fully charged LIBs using 45° Miura folding were examined. As shown in FIG. 8, under folding and unfolding, the output voltage remained steady at 2.65 V (same as the highest voltage shown in FIG.

6 for the fully charged LIB), even up to 1,340% linear deformability with respect to its completely compressed state.

Figure 9:
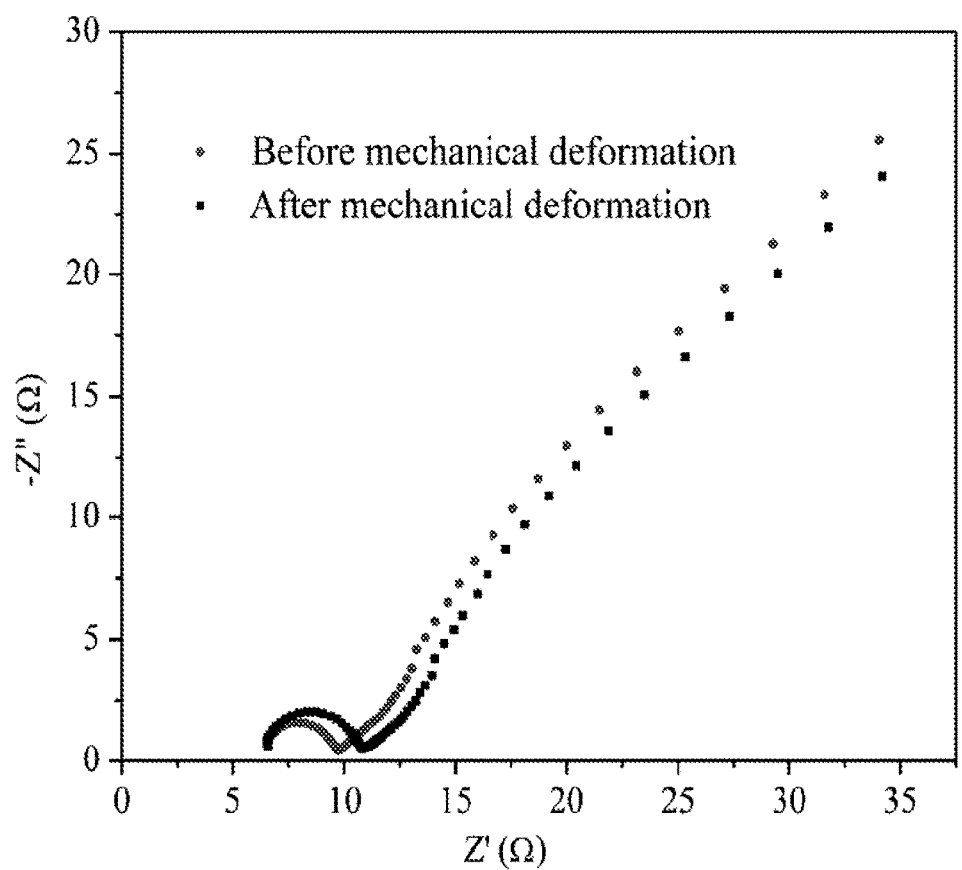
FIG. 9 shows a Nyquist plot indicating that the surface resistance of a LIB after mechanical deformation increases slightly.
Figure 10:
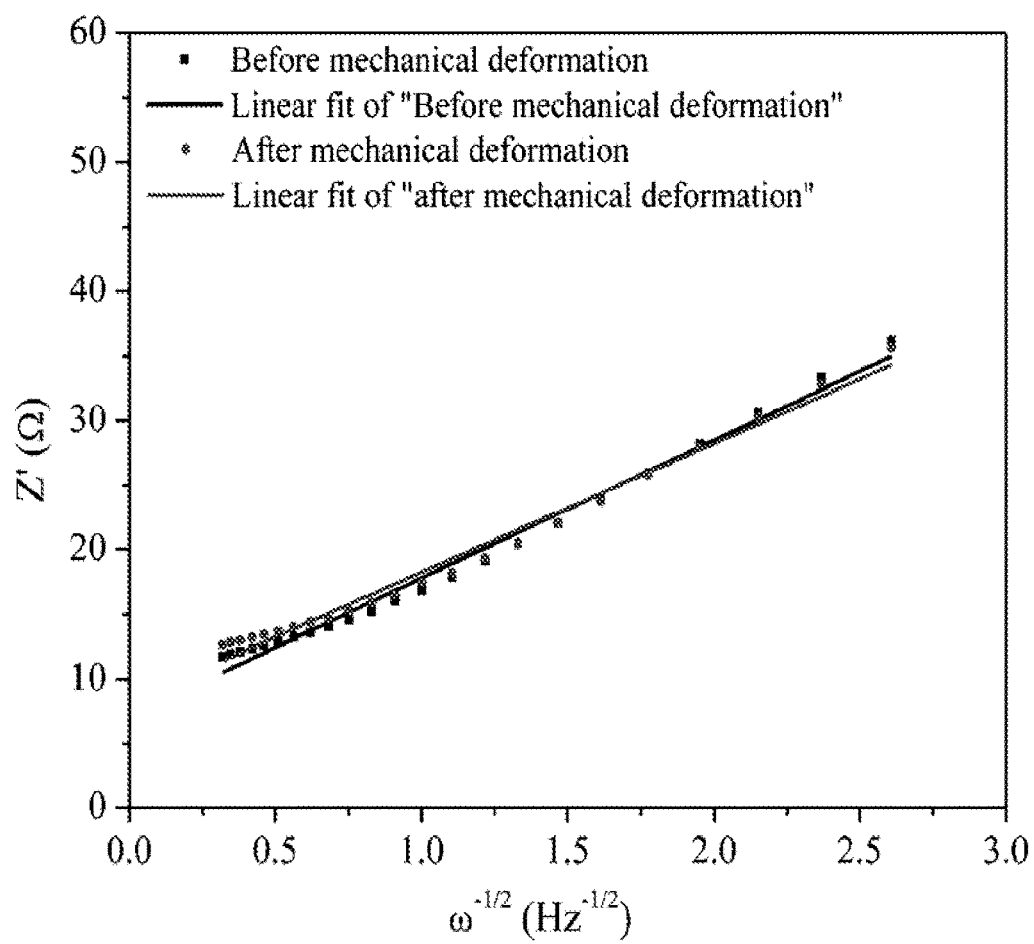
FIG. 10 shows a plot of frequency$^{-1/2}$ vs. the real part of resistance (Z'), with the slope of the straight line in the low frequency domain (Warburg resistance) corresponding to solid state Li-ion diffusion in the active electrodes (e.g., LTO and LCO).

FIGS. 9 and 10 show electrochemical impedance spectroscopy (EIS) analysis during the first discharge cycle before and after the mechanical deformation (completely compressed followed by bending and twisting), respectively, EIS studies were performed by applying a small perturbation voltage of 5 mV in the frequency range of 0.1 Hz to 100 kHz. Typical impedance spectra with high-to-middle frequency range semicircle and a relatively straight line representing the low frequency range for both curves were observed. Significant changes in the impedance before and after mechanical deformation were not observed. FIG. 9 shows a Nyquist plot indicating that the surface resistance of a LIB after mechanical deformation increases slightly, which may be due to the presence of tiny cracks and thickness change of solid electrolyte interface (SEI) layer. FIG. 10 shows a plot of frequency$^{-1/2}$ vs. the real part of resistant (Z'), with the slope of the straight line in the low frequency domain (Warburg resistance) corresponding to solid state Li-ion diffusion in the active electrodes (e.g., LTO and LCO). Li-ion diffusion does not show significant change before and after mechanical deformation.

Figure 5B:
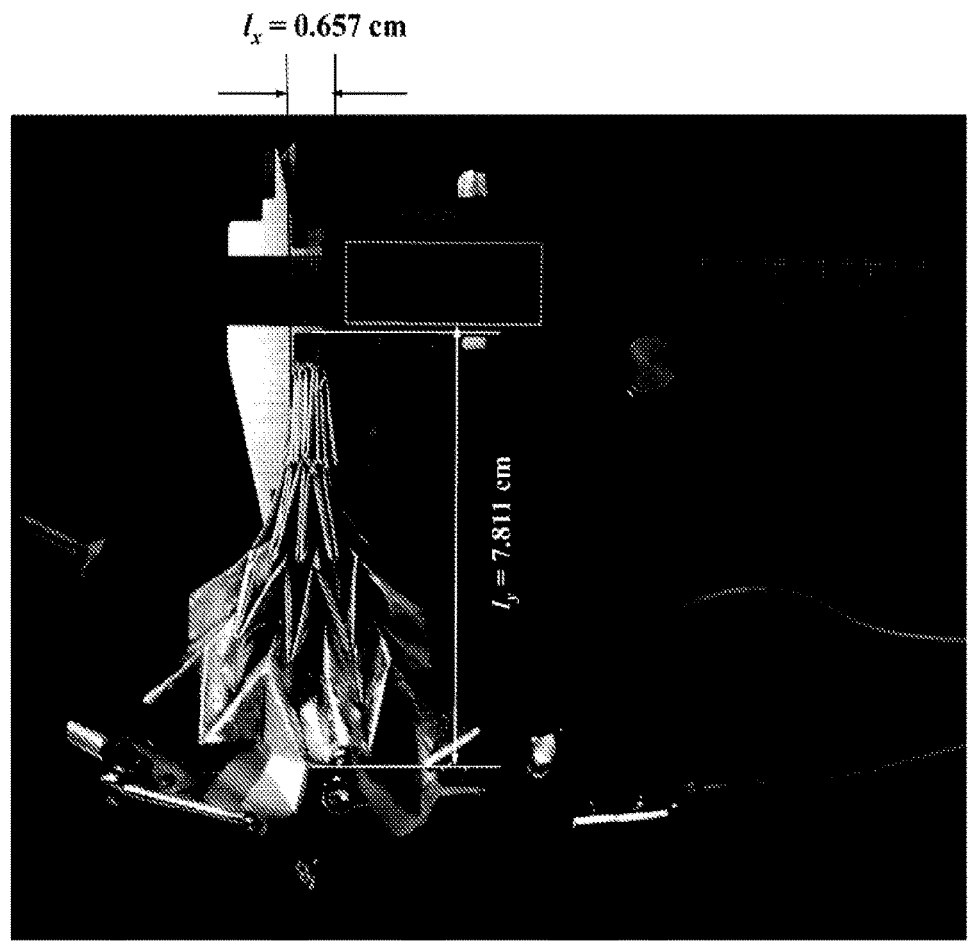
FIG. 5B is a photograph of an origami battery operating a LED in its completely compressed state.

The linear deformability $\varepsilon_{deformability}$ is defined by using the dimensions marked in FIGS. 5A and 5B as $$\varepsilon^x_{deformability} = \frac{L_x - l_x}{l_x}$$

for the x-direction, and $$\varepsilon^y_{deformability} = \frac{L_y - l_y}{l_y}$$

for the y-direction. $l_x$ and $l_y$ are the dimensions for the completely compressed slate (FIG. 5B), and $L_x$ and $L_y$ are the dimensions for the unfolded states, with the extreme case being the planar state shown in FIG. 5A. In other words, the deformability is defined for the unfolded states using the completely compressed state as the reference. This definition allows for the quantification of the extreme capacity for deformation in Miura folding, namely from the completely compressed state to the planar state through unfolding, and vice versa, from the planar state to completely compressed state through folding. Using the measured dimensions shown in FIGS. 5A and 5B, the origami LIB with 45° Miura folding demonstrated up to 1,340% linear deformability in the direction going from the completely compressed state to the planar state. The areal deformability $\varepsilon_{Areal}$ can be correspondingly defined as $$\varepsilon_{Areal} = \frac{L_x - l_x}{l_x},$$

and was found to reach 1,670%.

Figure 11:
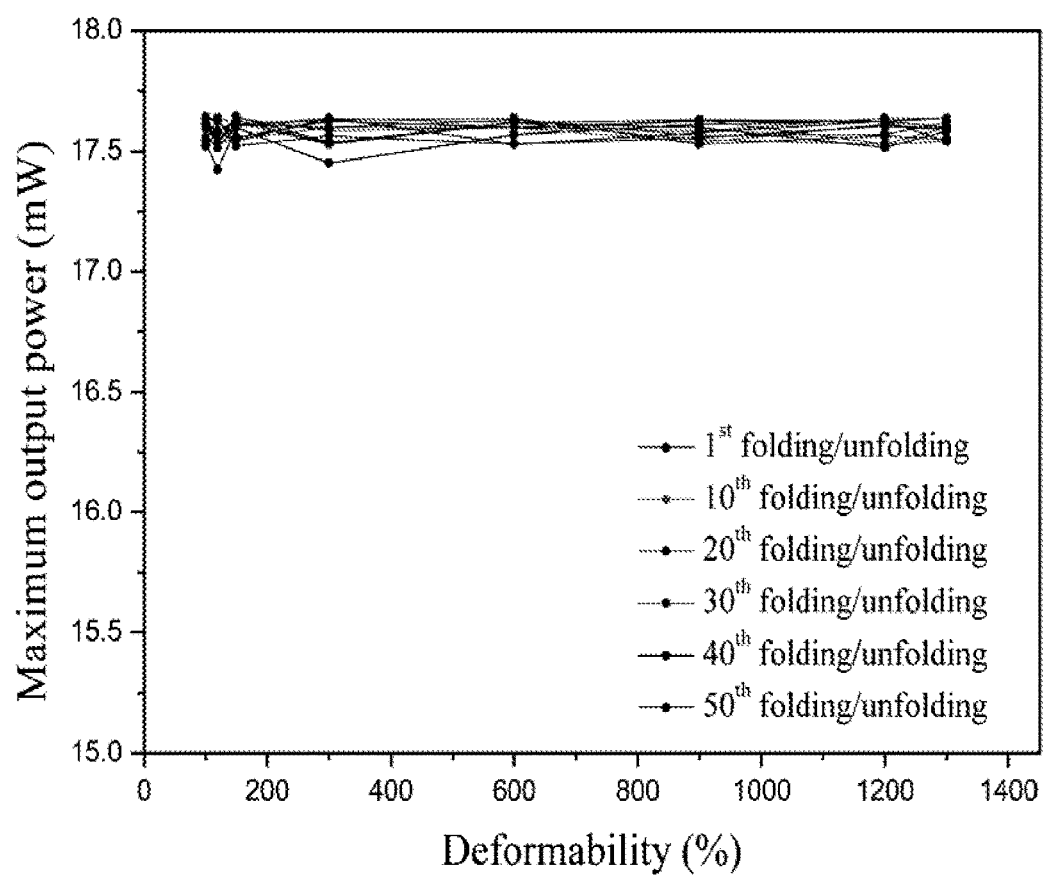
FIG. 11 shows maximum output power of an origami LIB as a function of linear deformability over 50 cycles of folding and unfolding.

FIG. 11 shows the maximum output power of the origami battery as a function of linear deformability, $$\varepsilon^x_{deformability} = \frac{L_x - l_x}{l_x},$$

under different cycles of linear deformation. Here the internal resistance of the battery was about 79Ω. Up to a linear deformability $\varepsilon^x_{deformability}$ of 1,340% and over 50 linear deformation cycles, the output power was quite stable and showed no noticeable decay. This stable performance is attributed to good bonding quality between the electrodes and CNT-coated paper current collectors, the unchanged electrical resistance of the CNT-coated paper current collectors upon linear deformation, and vanishing deformation at the parallelogram faces for rigid origami. The output power of 17.5 mW is sufficient to operate commercial light-emitting diodes (LEDs).

Figure 12A:
FIGS. 12A-12C are photographs showing an origami lithium-ion battery (LIB) using 45° Miura folding lighting up light-emitting diodes (LEDs) while undergoing linear deformation with over 1,300% strain (FIG. 12A), twisting (FIG. 12B), and bending (FIG. 12C).
Figure 12B:
Figure 12C:

FIGS. 12A-12C show photographs of an origami LIB using 45° Miura folding lighting up a LED while undergoing linear deformation with over 1300% strain (FIG. 12A), twisting (FIG. 12B) and bending (FIG. 12C). As shown in FIGS. 12A-12C, LEDs driven by this LIB do not show noticeable dimming upon cyclic linear deformation, even for a higher deformation rate (~0.2 ms$^{-1}$).

Figure 13:
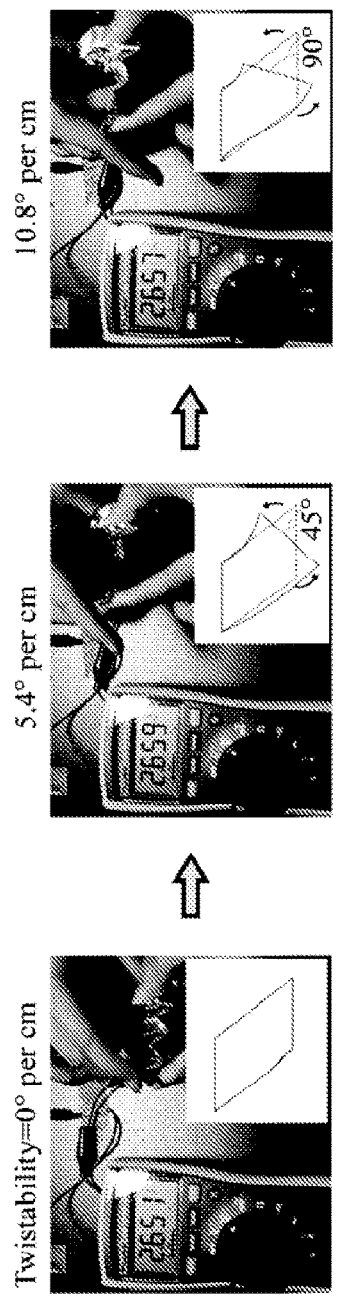
FIG. 13 is a series of photographs showing twisting of an origami LIB connected with a voltmeter.
Figure 14:
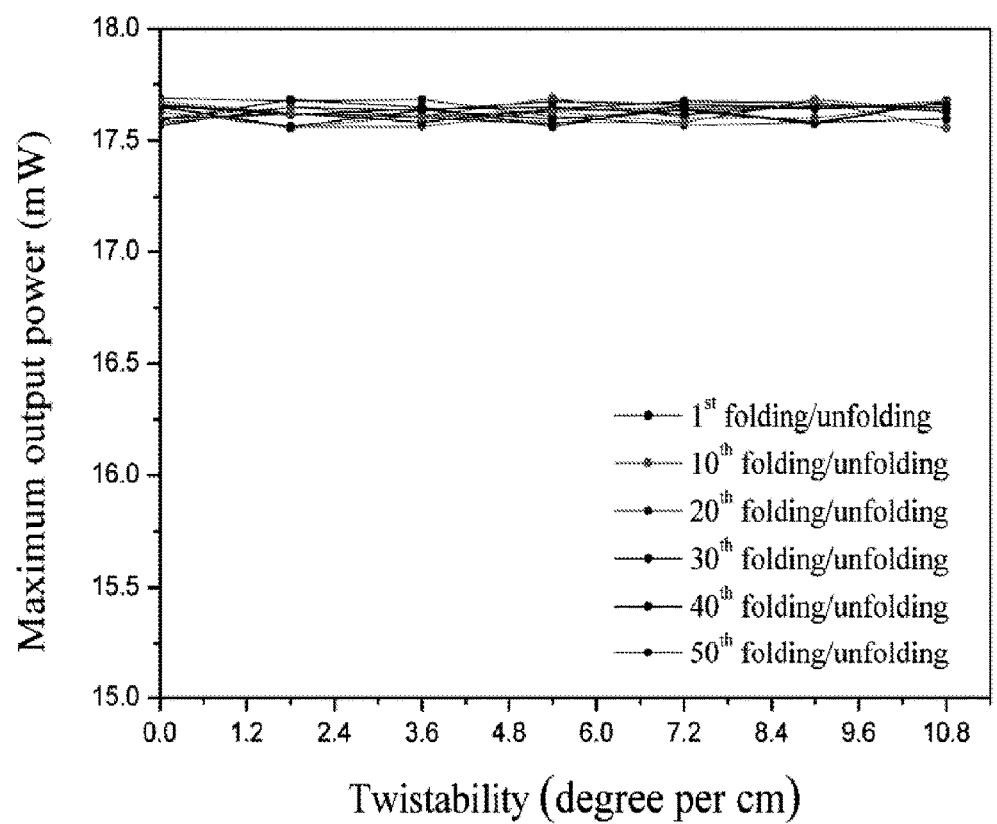
FIG. 14 shows maximum output power of an origami battery using 45° Miura folding as a function of twisting angle for various twisting cycles.

FIG. 13 shows a series of photographs of the same origami battery shown in FIGS. 12A-12C subjected to torsion alter tension. The origami battery using 45° Miura folding can bear large torsion of up to 10.8° cm$^{-4}$ twisting angle without degradation of the output voltage. FIG. 14 shows the maximum output power of the battery as a function of twisting angle for various twisting cycles in which a similar stability to that for tension was repeatedly observed.

Figure 15:
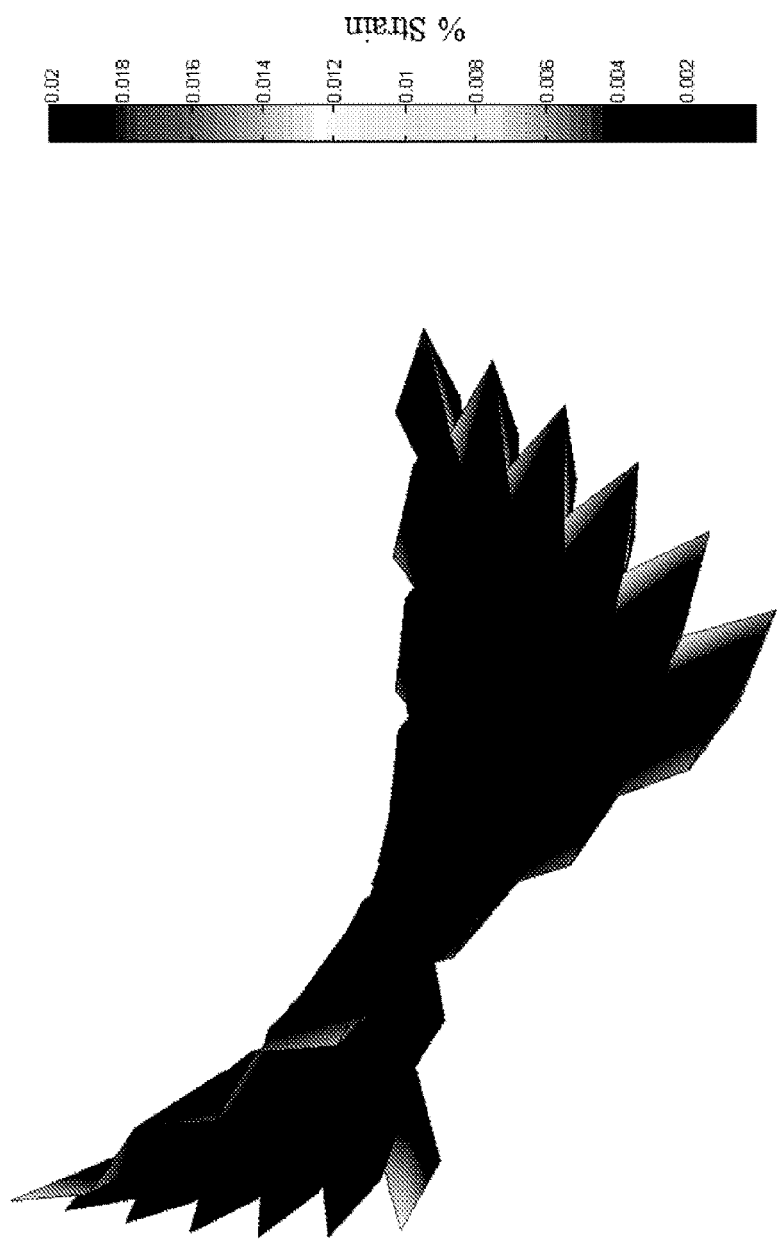
FIG. 15 shows finite element results of the strain contour of a 45° Miura pattern subjected to twisting with twisting angle of 90° per unit cell.

For a rigid origami, there are (n−3) degrees of freedom, with n as the number of edges at one vertex, which gives only one degree of freedom for the Miura pattern in (n=4). Therefore, an ideally rigid Miura folded device can only bear linear deformation, and torsion will cause strain on those parallelogram faces. Finite element analysis (FEA) was conducted by using a recently developed approach, and the strain contour is shown in FIG. 15 for 10° per unit cell twisting angle, where the size of a unit cell is the shortest length of one parallelogram face. The strain for most of the area was vanishingly small, with strain levels on the order of 0.001%.

Figure 16:
FIG. 16 is a series of photographs showing bending of an origami LIB connected to a voltmeter.
Figure 17:
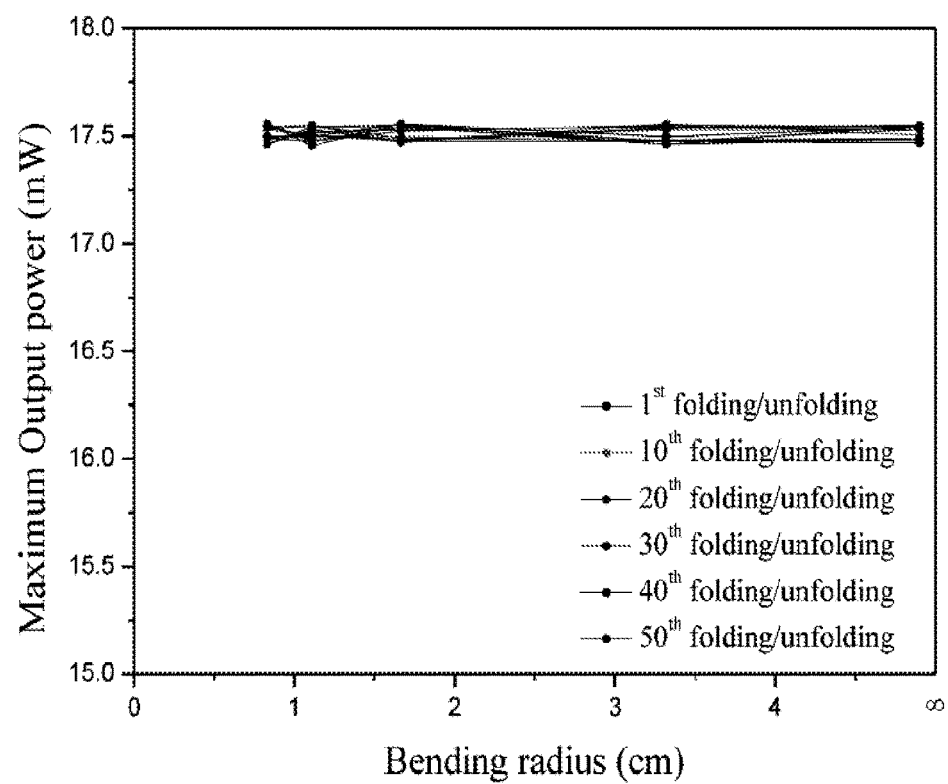
FIG. 17 shows maximum output power of the origami battery using 45° Miura folding as a function of bending radios for various bending cycles.
Figure 18:
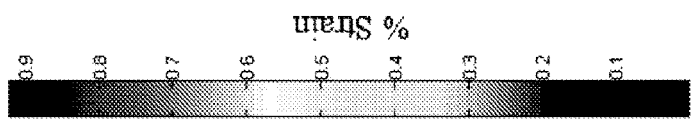
FIG. 18 shows finite element results of the strain contour of a 45° Miura pattern subjected to bending with bending radius of 2 unit cells.
Figure 18:
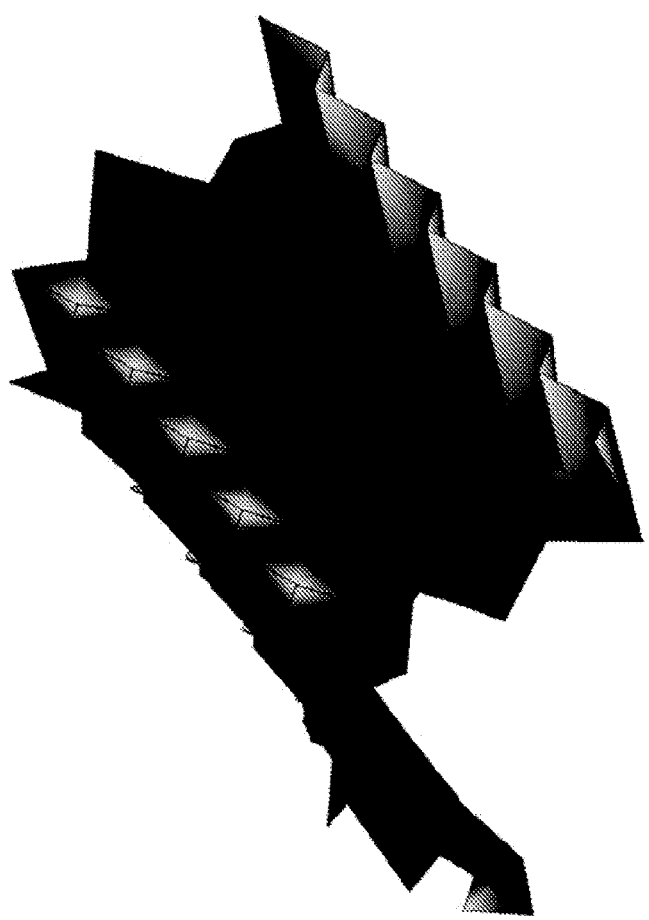

After tension and torsion, the same device was subjected to bending, as shown in FIG. 16. Similar mechanical robustness was observed as for tension and torsion; the origami battery could be wrapped around an index finger (with bending radius of about 0.83 cm) without a large change in the output voltage. FIG. 17 shows the maximum output power versus bending radius under different bending cycles, and the power stability was repeatedly observed. Bending is similar to twisting as it causes strain on the parallelogram faces. FIG. 18 shows the strain contour of a bent Miura folding pattern with bending radius of 2 unit cells, showing that the strain was again small—on the order of 0.1%.

Figure 19:
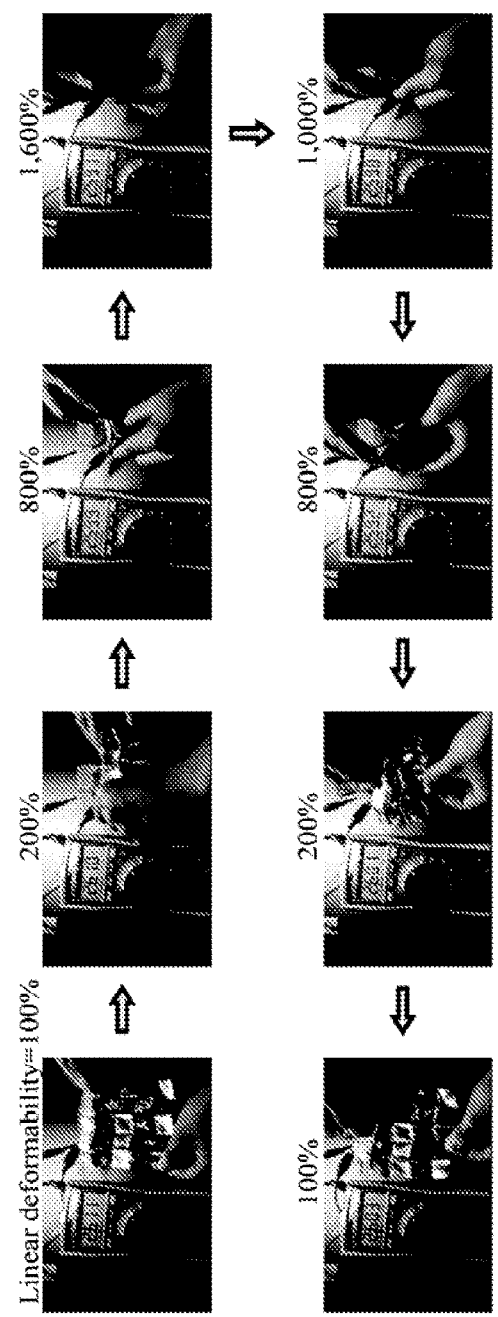
FIG. 19 is a series of photographs showing an origami battery using 90° Miura folding subjected to folding and unfolding and connected to a voltmeter.

In additional to the 45° Miura folding pattern that can achieve significant linear deformability and bear tension, torsion and bending, a Miura folding pattern with 90° angle (FIG. 3B) was also utilized. This folding can be completely collapsed in biaxial directions and thus can reach very high areal deformability. As shown in FIG. 19, for a 90° Miura pattern with 5×5 parallelogram faces, the areal deformability $\varepsilon_{Areal}$ can be as high as 1,600%, which can be further increased using a denser Miura pattern, such as 10×10 pattern.

Comparison of Origami and Conventional LIBs.

The superior deformability of origami LIBs is believed to be mainly due to two mechanisms, namely the use of rigid origami that can achieve deformability through folding and unfolding at creases and does not strain the rigid faces, and the use of CNT-coated paper current collectors that survive at the creases and form good adhesive between electrodes. FIGS. 20A-20D show images of origami LIBs using CNT-coated paper current collectors, and FIGS. 21A-21D and 22A-22D show images of LIBs using conventional active materials and current collectors.

Figure 20A:
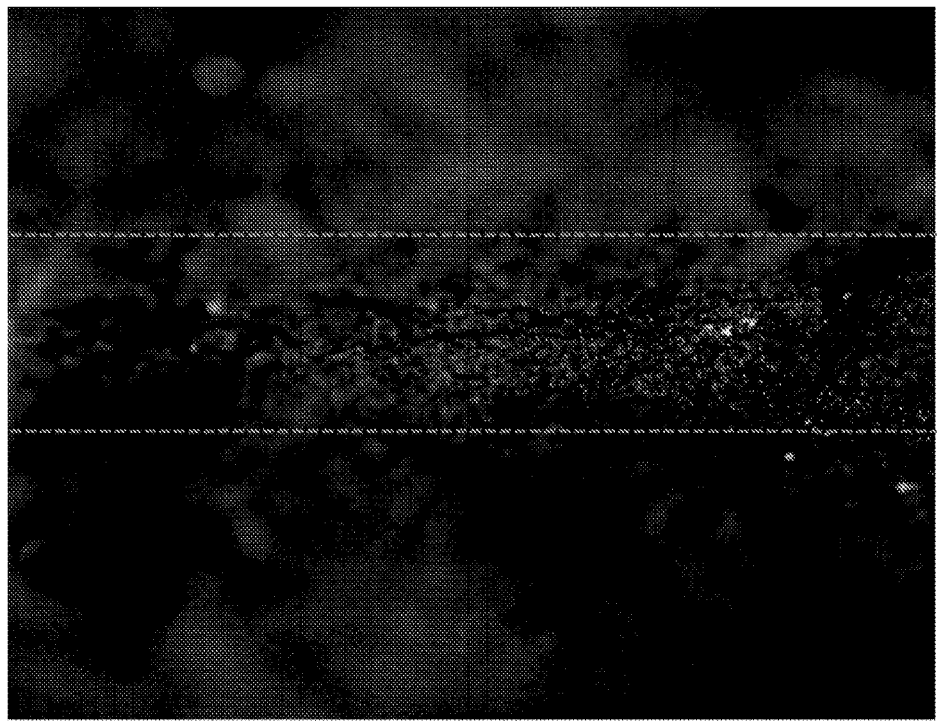
FIGS. 20A-20D show images of origami LIBs using carbon nanotube (CNT)-coated paper current collectors, after cyclic electrochemical charge and discharge, as well as many cycles of mechanical loads.
Figure 20B:
Figure 20C:
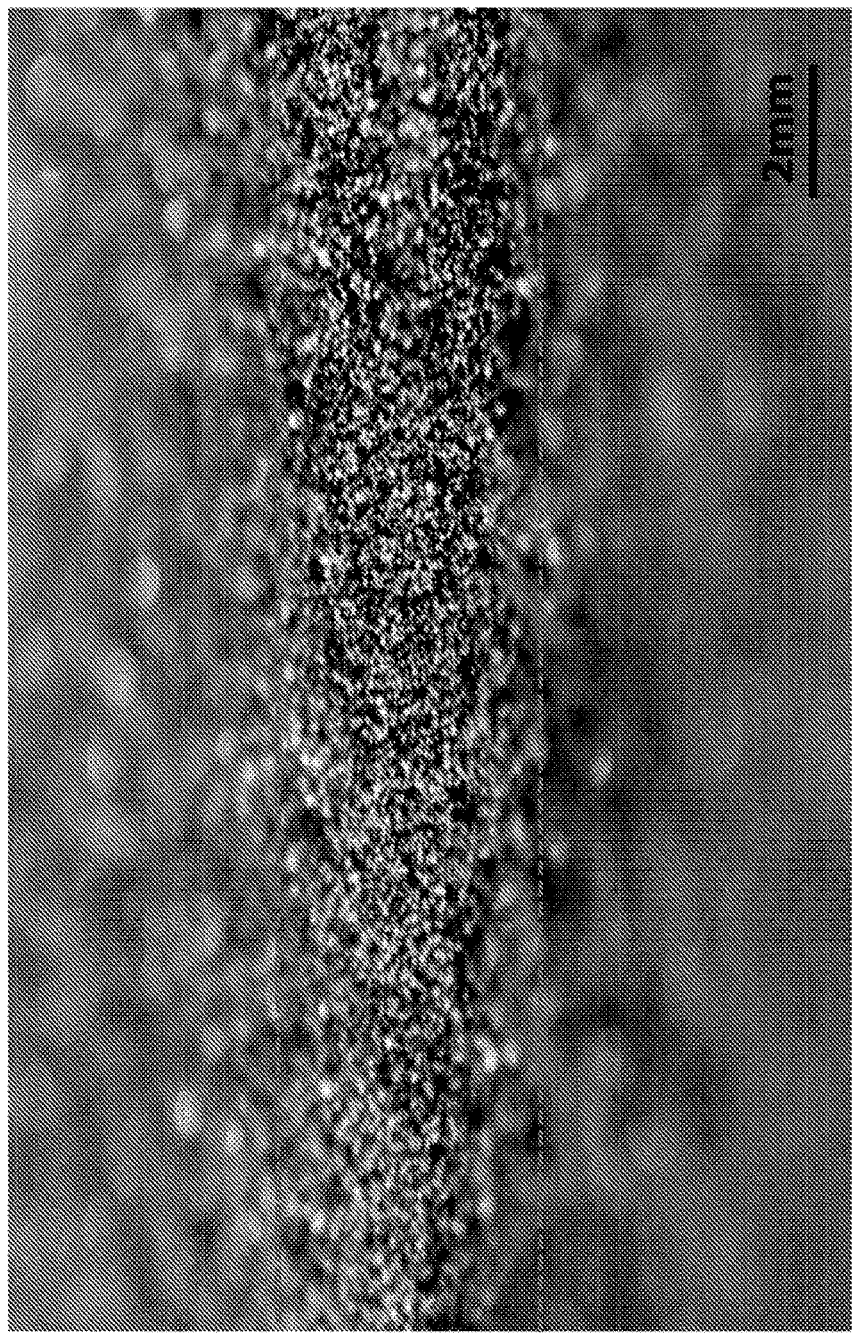
Figure 20D:
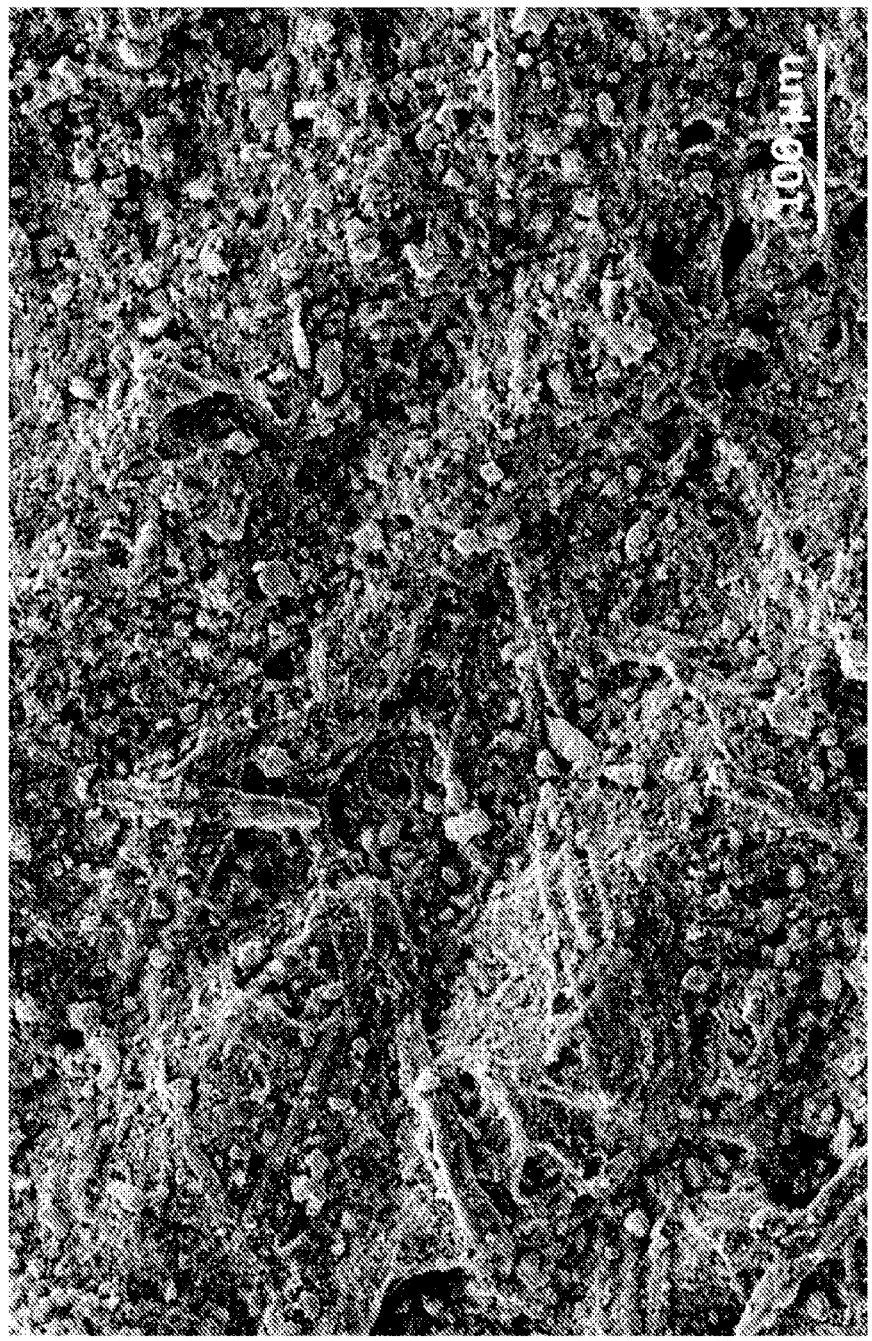
Figure 21A:
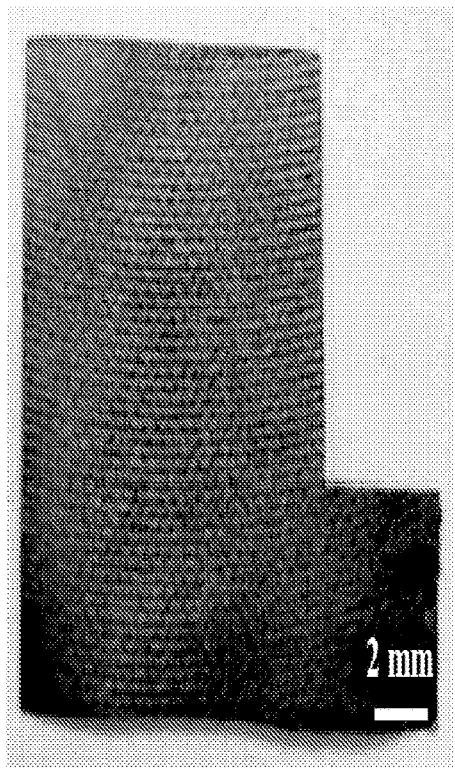
FIGS. 21A and 21B show optical images of graphite electrodes prior to and after folding, respectively, before charge.
Figure 21B:
Figure 21C:
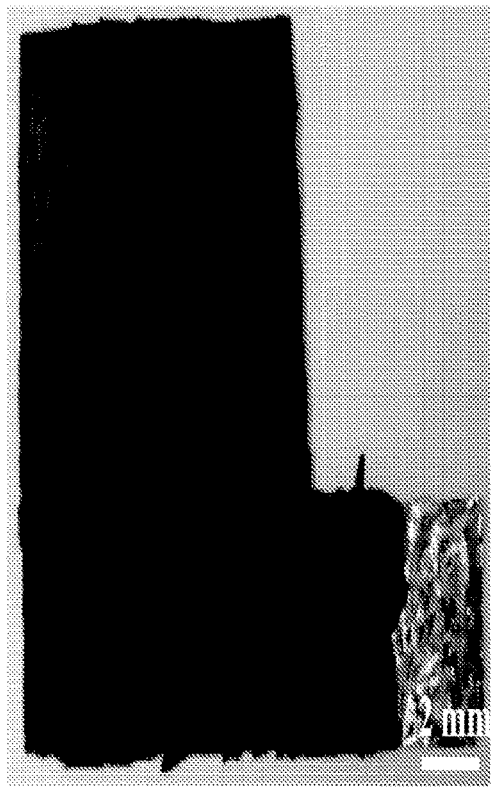
FIGS. 21C and 21D show optical images of $LiCoO_2$ (LCD) electrodes prior to and after folding, respectively, before charge.
Figure 21D:

FIGS. 20A and 20B show optical and SEM images of the lithiated $Li_4Ti_5O_{12}$ (LTO) active layers, respectively, and FIGS. 20C and 20D show optical and SEM images of $LiCoO_2$ (LCO) active layers, respectively. In the regions of a crease, after the cyclic electrochemical characterization and mechanical loads (linear deformation, twisting, and bending up to more than 100 times) were performed. Although there were some voids and cracks observed, particularly in the lithiated LTO films at the paper current collector, there was no noticeable delamination from the CNT-coated current collectors us compared with those before lithiation as shown in FIGS. 4D-4G. This behavior could be explained by the interconnected fabric-like and porous structure of the CNT-coated paper current collectors (as shown in FIGS. 4A and 4B) providing a continuous network for electron transport and significantly enhancing the bonding to the anode and cathode active material layers.

To verify this hypothesis, conventional electrodes and current collectors (i.e., graphite on Cu foil for the anode and LCO on Al foil for the cathode) were utilized to assemble a LIB cell followed by 45° Miura folding. The assembled LIB cell using conventional materials had a similar thickness (360 μm) as the origami LIBs and the detailed processes are provided in the supporting information. FIGS. 21A-21D show optical images of the graphite and LCO electrodes before and after folding. It is apparent that some active materials were lost from the conventional, current collectors, even before charging.

Figure 22A:
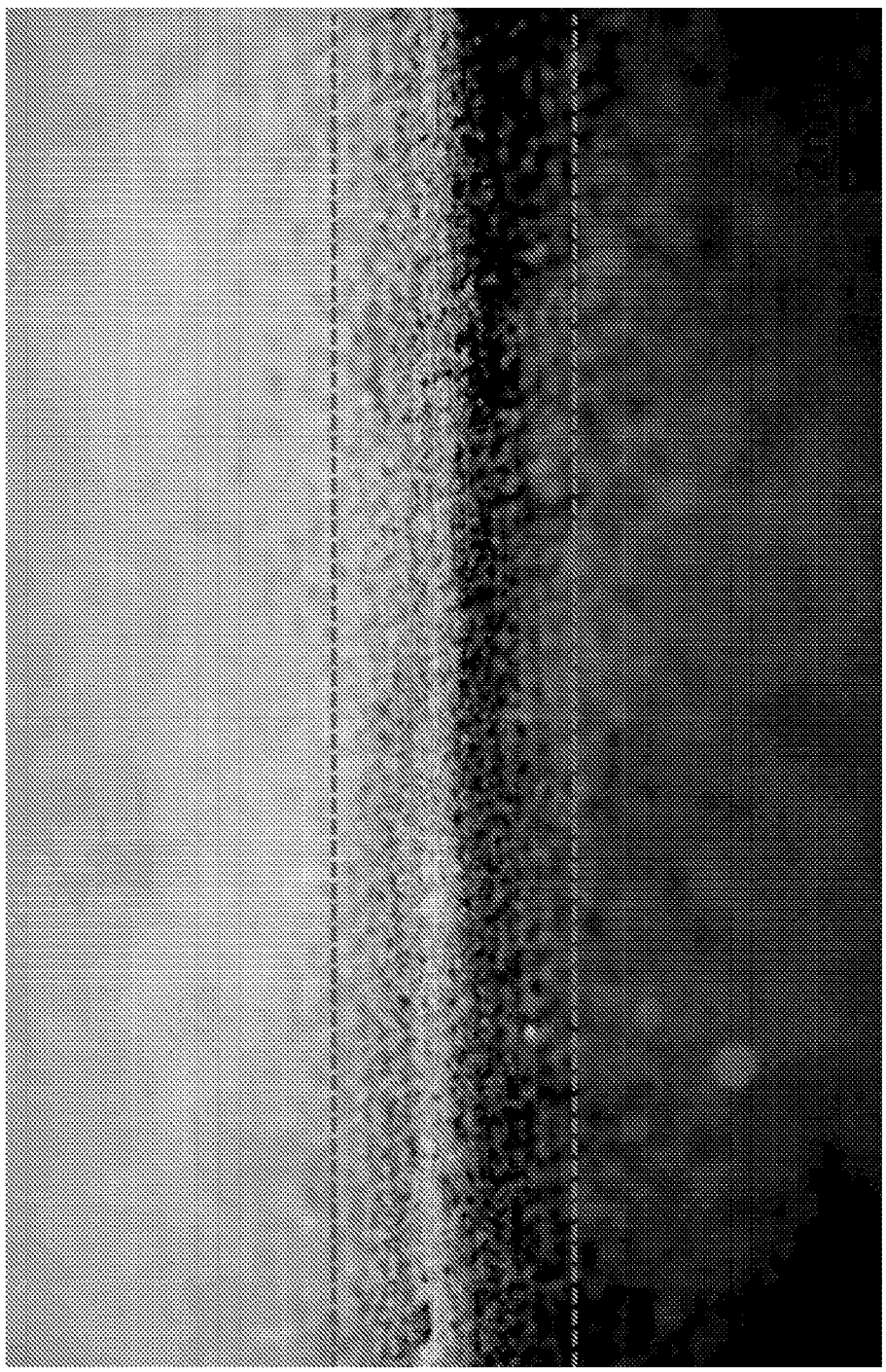
FIGS. 22A-22D show images of origami LIBs using conventional current collectors (Cu and Al) after one electrochemical charge without mechanical loads.
Figure 22B:
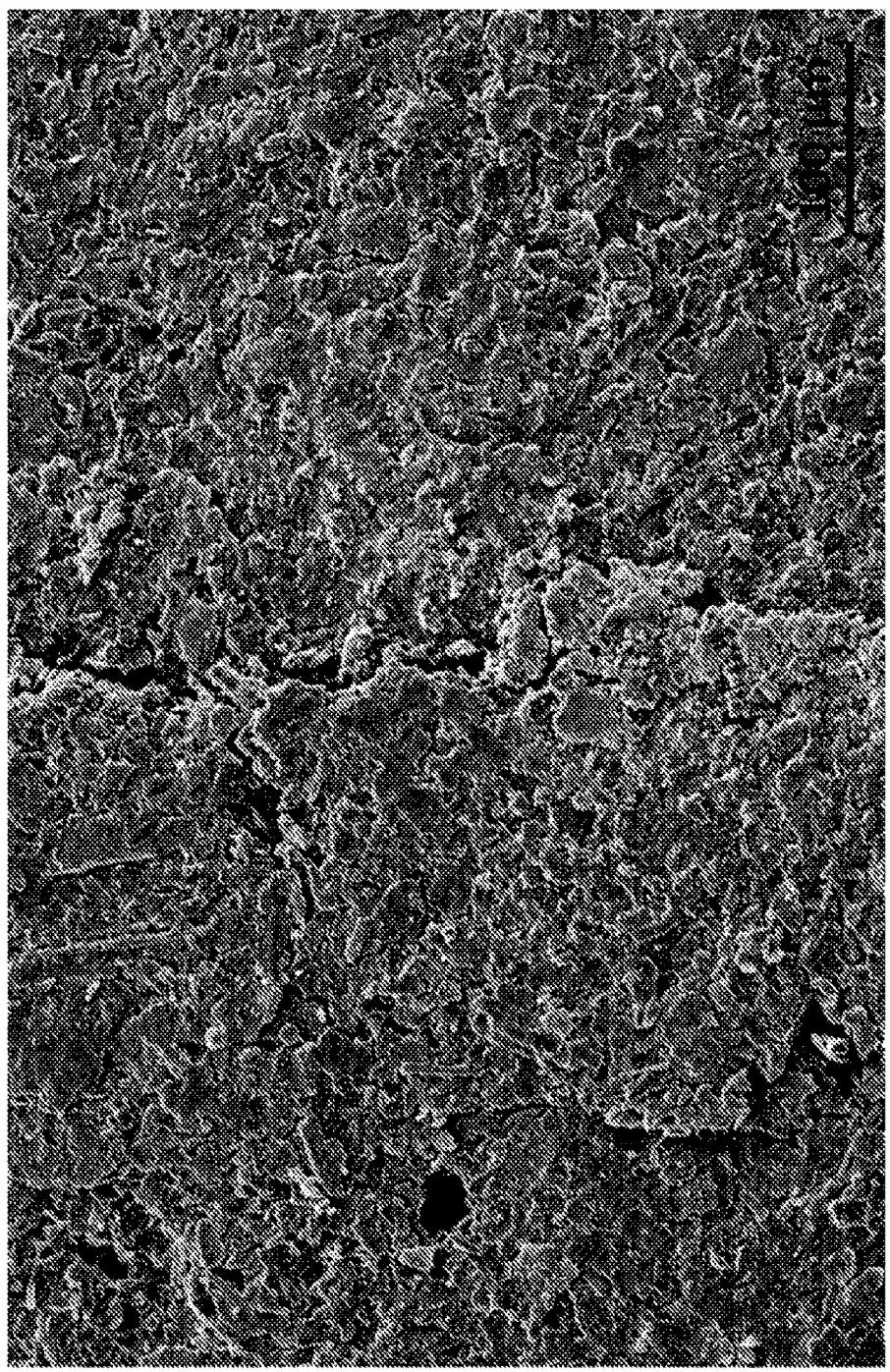
Figure 22C:
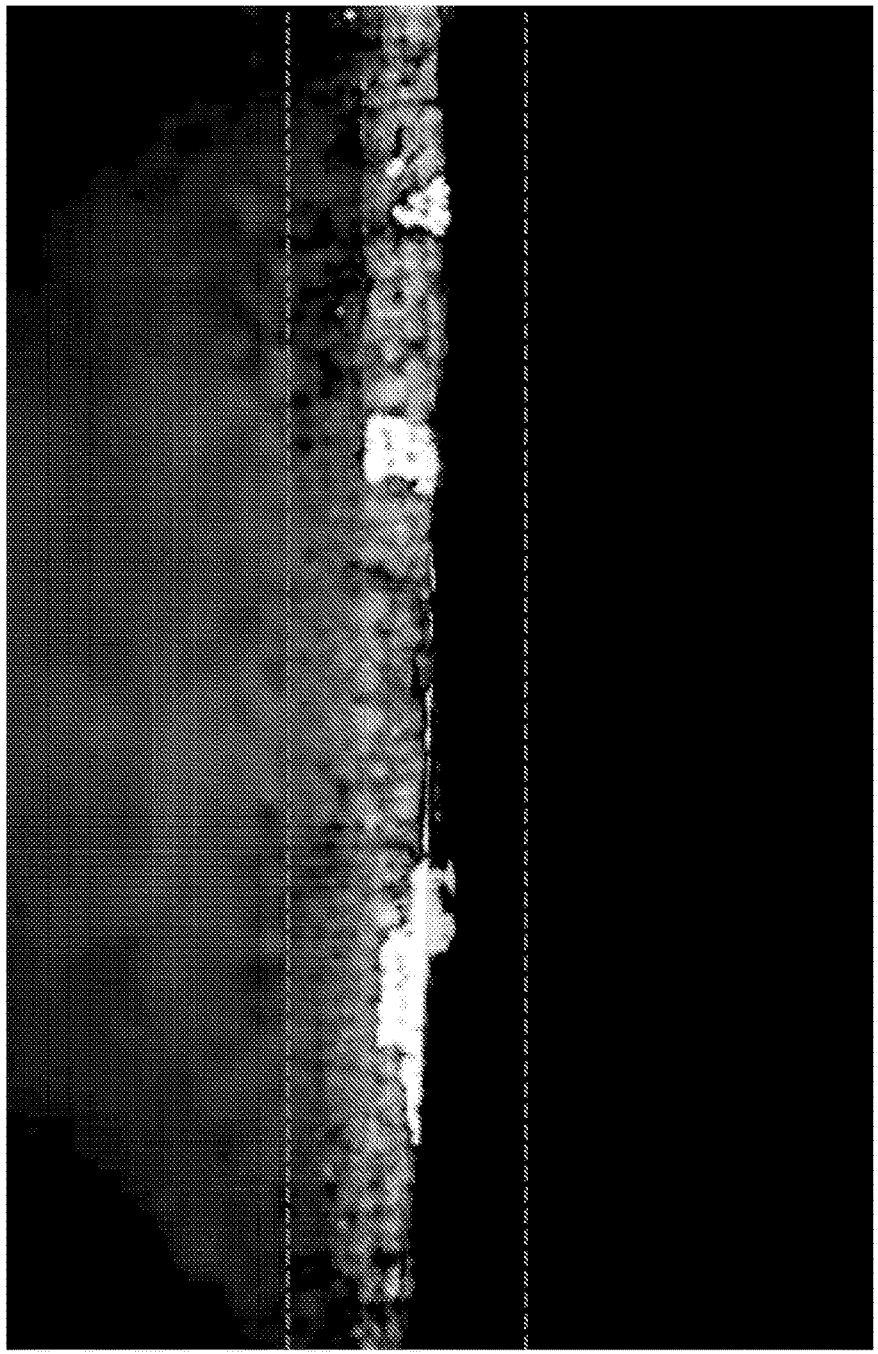
Figure 22D:
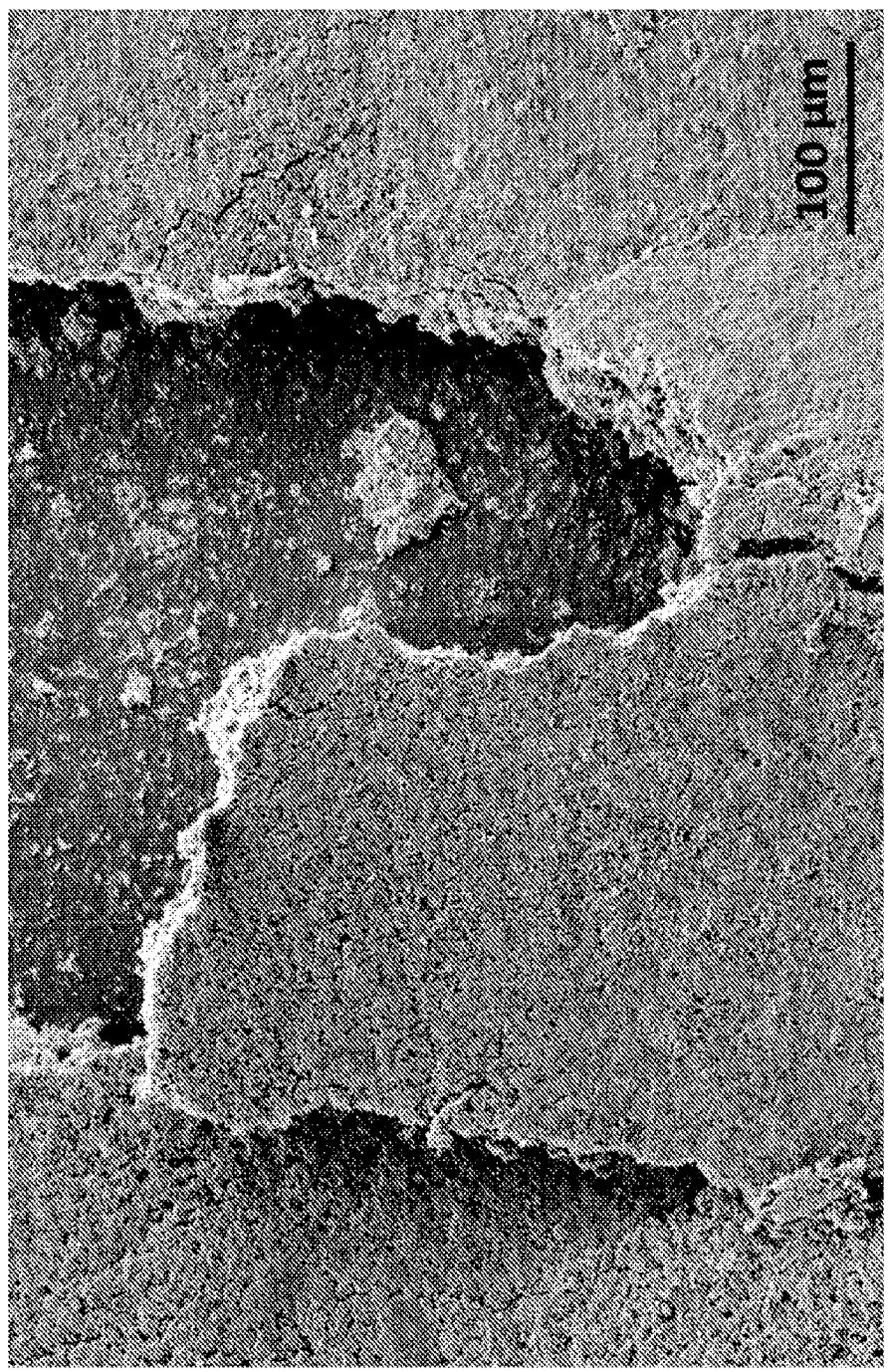
Figure 23:
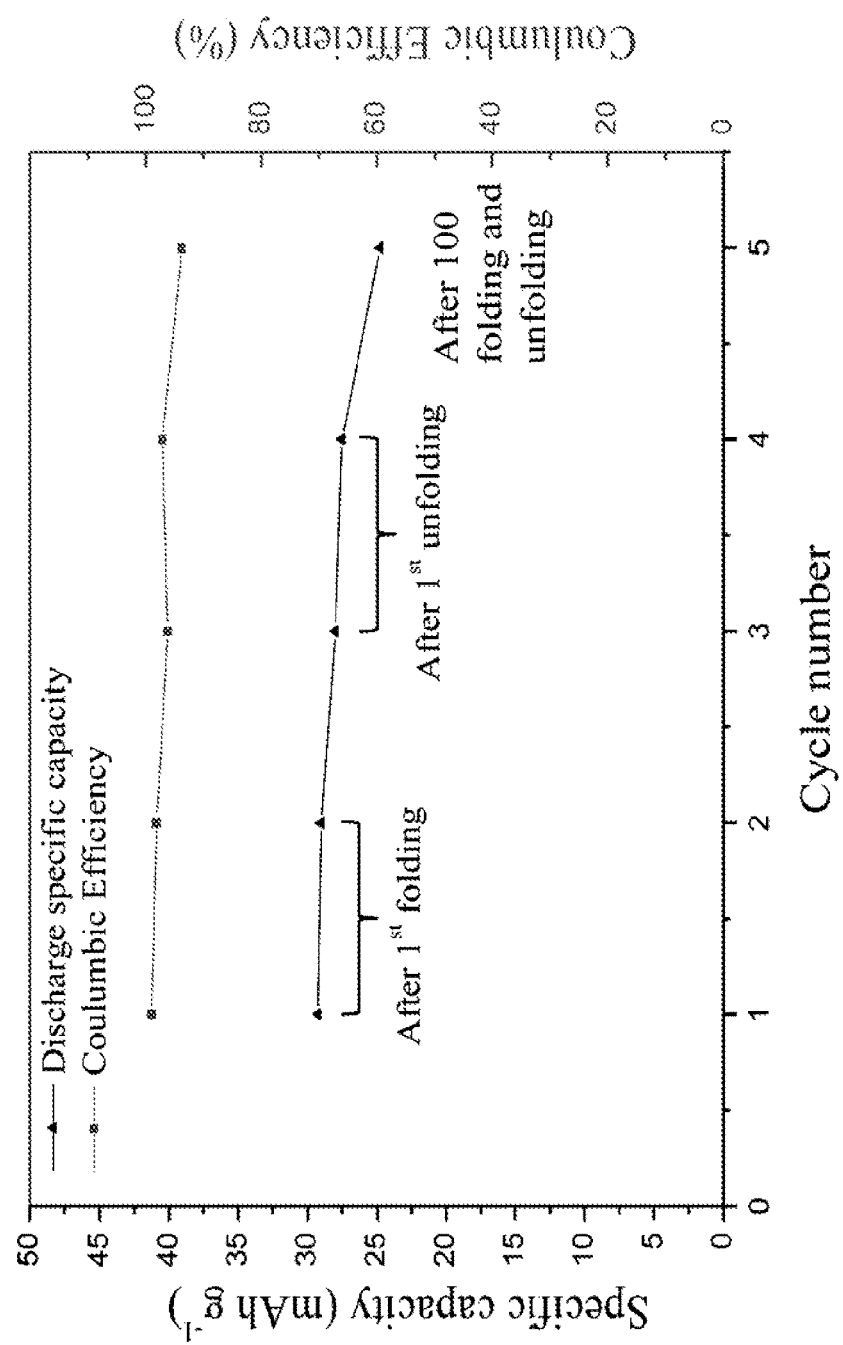
FIG. 23 shows capacity of an origami battery using 45° Miura folding and conventional active materials and current collectors.

FIGS. 22A and 22B show optical and SEM images of the lithiated graphite, respectively, and optical and SEM images of the LCO, respectively, in the regions of a crease alter the first charge and without mechanical loading. More electrode materials have been lost, which indicates insufficient thin film bonding at the creases. FIG. 23 shows that the energy capacity of the origami battery using conventional materials decayed about 10% after 100 cycles of linear deformation, in contrast to the steady capacity observations for the origami LIBs using CNT-coated paper current collectors.

The origami LIBs described herein demonstrate mechanical deformability including folding, unfolding, twisting and bending, and good conductivity and strong bonding after cyclic folding and unfolding have been demonstrated. The use of CNT-coated paper as current collectors provides stable electrochemical characteristics under cyclic mechanical deformations. The fabrication process for origami LIB cells, including slurry mixing, coating and packaging, is compatible with mainstream industrial processing.

To utilize this origami battery concept in realistic applications with high level of deformability, at least two approaches can be considered. The first approach is to build a functional system that includes energy harvesting devices (e.g., solar cells), energy storage devices (e.g., lithium-ion batteries) and a functional device (e.g., a display) in the same origami platform to enable equivalent deformability to each component in the system. The second approach is to build a standalone lithium-ion battery by encapsulating the origami battery with highly deformable elastomers to provide a flat device that could then be integrated with other functional devices leading to a fully deformable system. At a high level, the strategy of fusing the art of origami with materials science, and energy storage devices provides an alternative approach for powering deformable (including, flexible, foldable, stretchable and curvilinear) electronics ranging from displays, sensors, solar cells and antenna.

EXPERIMENTAL

Preparation of Origami LIBs on CNT-Coated Paper.

CNT-coated paper was prepared as the current collector on laboratory Kimwipes using P3 CNTs from carbon solutions as described in Example 2 below. The final mass loading of CNTs on the CNT-coated paper was ~0.8 mg $cm^{-2}$. Cathodes and anodes were prepared by depositing $LiCoO_2$ (LCO, Sigma-Aldrich) and $Li_4Ti_5O_{12}$ (LTO, MTI Corp.) slurries onto the CNT-coated paper. Multilayer stacking structures as shown in FIG. 1 were prepared, with aluminized polyethylene (PE) (Sigma-Aldrich) as the packaging material, CNT-coated papers as anode and cathode current collectors, LTO and LCO as anode and cathode electrodes, respectively, polypropylene (Celgard 2500) as separator, and 1 M $LiPF_6$ in EC:DMC:DEC (4:2:4) as electrolyte. The mass ratio for LTO:LCO was fixed at ~1.6. Three layers of anode electrode connected with a copper tab, separator soaked in electrolyte, and cathode electrode connected with an aluminum tab were placed in an aluminized/PE bag and assembled in an Argon filled glovebox.

Fabrication of Origami LIBs Using Conventional Materials.

The same multilayer stacking structures as shown in FIG. 1 were used to fabricate the origami LIBs using the conventional materials, where aluminized polyethylene (PE) (Sigma-Aldrich) was the packaging material; copper (Cu) and aluminum (Al) as the anode and cathode current collectors, respectively; graphite and ECO as anode and cathode electrodes, respectively, polypropylene (Celgard 2500) as separator, and 1 M $LiPF_6$ in EC:DMC:DEC (4:2:4) as electrolyte. Anode slurries were prepared by mixing graphite (Fisher Scientific), carbon black (Super C45), Carboxymethyl cellulose (Fisher Scientific), Styrene Butadiene Rubber (Fisher Scientific) and DI water with a ratio of 76:2:1:2:160 by weight. Then the slurry was uniformly coated on Cu with 20 μm in thickness (CF-T8G-UN, Fred Materials International, Inc.), and then dried on a hot plate at 120° C. for 5 hours. Cathode slurries were prepared by mixing the LCO, PVDF (MTI Corp.), Carbon black (Super C45) and N-Methyl-2-pyrrolidone solvent (CreoSalus) with a ratio of 18:1:1:20 by weight. Then the slurry was uniformly coated on Al with 10 μm in thickness (Reynolds Wrap), and then dried on a hot plate at 120° C. for 5 hours. A mass ratio for graphite:LCO was around 2.0. Then the anode and cathode electrodes were subject to press to make condensed electrodes. The LIB was packaged with aluminized polyethylene as described herein.

Electrochemical Characterization.

An Arbin electrochemical workstation with a cutoff voltage of 2.65-4.2 V at room temperature was used to conduct cyclic galvanostatic charge and discharge of the origami batteries under folding, unfolding, bending and twisting. Areal coverage was calculated based on the ratio of areas of active electrodes ($L_{xact} \times L_{yact}$) and the entire origami battery ($L_x \times L_y$) in at the completely unfolded state, as shown in FIG. 5A. The maximum output power of the fully charged battery was calculated using $$\frac{1}{2}\frac{V^2}{R_i},$$

where V is the open, circuit voltage and $R_1$ is the internal resistance as a function of system-level mechanical strain and cycles of mechanical loading. When the origami battery was subjected to different mechanical loading, values of voltage were measured using a voltmeter. The electrochemical impedance spectroscopy (EIS) studies were performed by applying a small perturbation voltage of 5 mV in the frequency range of 0.1 Hz to 100 kHz during the first discharge cycle before and after mechanical deformation, using a Gamry Echem Analyst. The analysis of the impedance spectra was conducted using equivalent circuit software provided by the manufacturer.

Example 2

Li-ion batteries were prepared based on the methods established by Hu, et al. (Proc. Natl. Acad. Sci. U.S.A. 2009, 21490) using carbon nanotube (CNT) coated papers as the current collectors and depositing conventional active material layers on top of them, CNT inks were prepared with 4 mg/mL single-walled carbon, nanotubes (P3, Carbon Solutions) and 8 mg/mL sodium dodecylbenxenesulfonate (SDBS), Sigma-Aldrich). The CNT ink was sonicated for 25 minutes to obtain a uniform dispersion. Afterwards, the paper was soaked in the CNT ink solution to ensure that the CNTs would be distributed uniformly on the surface and within the paper pores. The CNT-coated paper was then dried with a heat gun set to 200° F. (93° C.). The soaking and drying process was repeated 1.3-15 times followed by washing with deionized water and ethanol three limes each to obtain a sheet resistivity as low as 5 Ω/square. The resistance was around 6-8Ω between the two sides of the CNT-coated paper. Effective washing to remove excess surfactant was need to improve the conductivity of the CNT-coated papers. The amount of material deposited was determined by measuring the mass of the paper before and after coating/drying using an ultramicrobalance (Mettler-Toledo UMX2).

Figure 24:
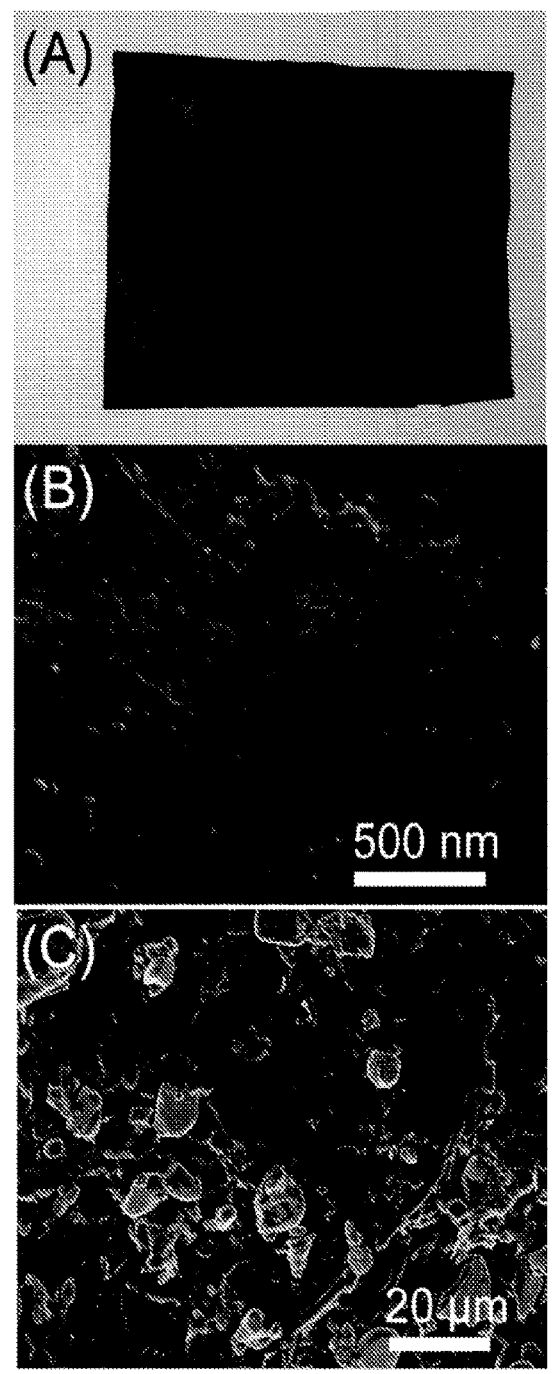
FIG. 24 shows (A) a photograph of CNT-coated paper with dimensions of 6 cm×7 cm; (B) scanning electron microscope image of the surface of the CNT-coated paper; and (C) scanning electron microscope image of the CNT-coated paper with $LiCoO_2$ active material.
Figure 25:
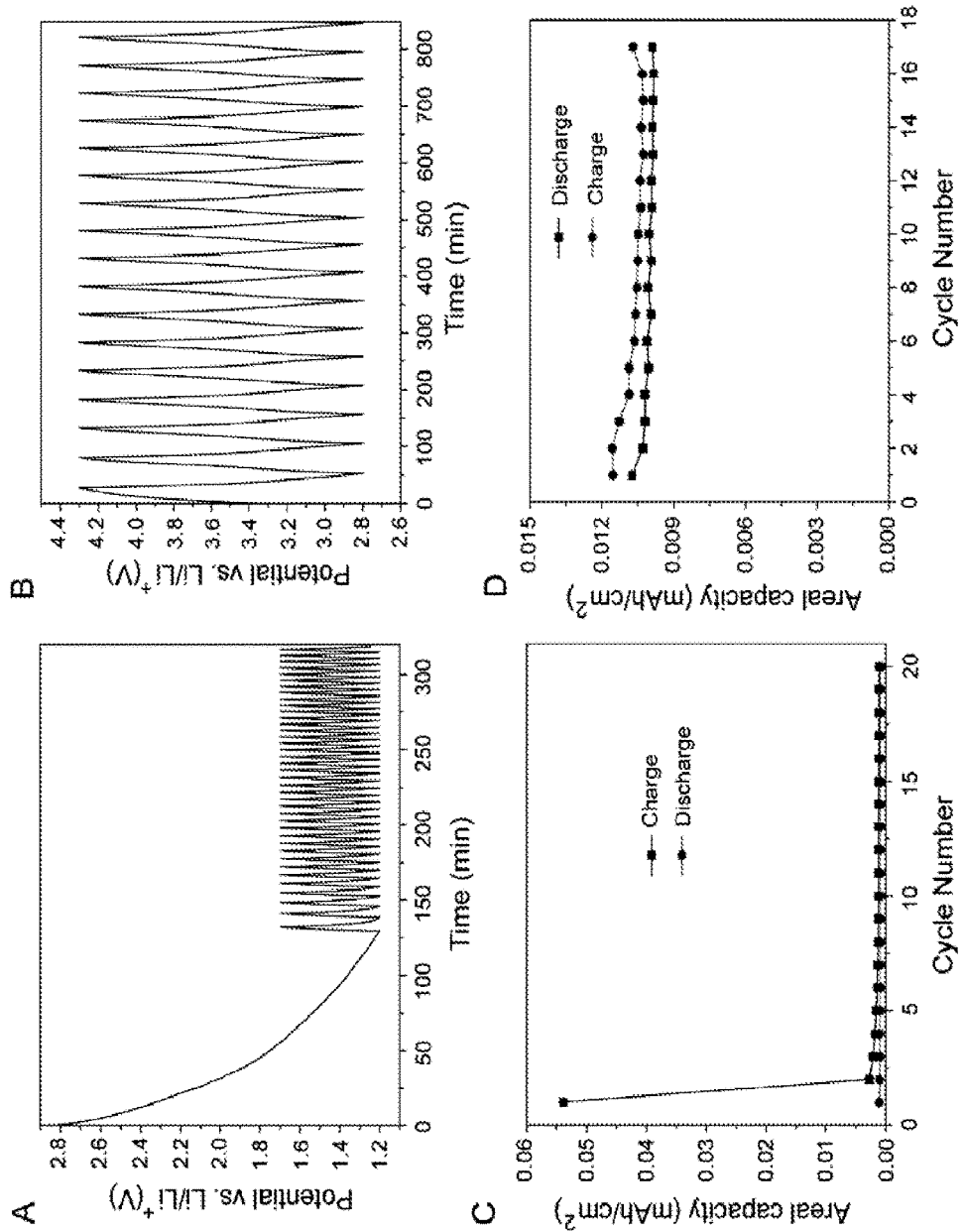
FIG. 25 shows the result of the cycling of CNT-coated papers in a half-cell using 25 mA/g. (A) and (B) are the voltage profiles; and (C) and (D) are the areal capacity vs. cycle number. (A) and (C) are for cells cycled in the same range as the LTO anode; and (B) and (C) are for cells cycled in the same range as the LCO cathode.

Laboratory Kimwipes (Kimtech Science, Kimberly-Clark) were used as substrates because the thin and porous nature of the paper allowed the CNT ink to diffuse easily both inside and outside of the paper. This resulted in CNT-coated papers that were conductive on either side. FIG. 24A shows a photograph of a CNT-coated paper. FIG. 24B shows the scanning electron microscopy (SEM) image of the surface of the CNT-coated papers, showing the CNTs formed ropes, and were uniformly distributed on the surface of the paper. To check if the CNT-coated papers would exhibit any reversible capacity, half-cells were prepared using Li metal as counter electrode and 1 M $LiPF_6$ in EC/DMC/DEC (4:2:4) as electrolyte (MTI Corp). A piece of Cu foil was placed under the CNT-coated paper as an additional current collector and it was tested from 1.7 to 1.2 V versus Li/Li-f at 25 mA/g as an anode control test (FIG. 25A), for the cathode control test, a piece of Al was used as an additional current collector and it was tested from 2.8 to 4.2 V vs Li/Li+ at 25 mA/g (FIG. 25B). As shown in FIG. 25C, the CNT-coated paper had a charge capacity of 0.054 mAh/cm2 in the first cycle, but this decreased to about 1 μAh/cm2 in subsequent cycles. This irreversible capacity loss could be due to solid electrolyte interphase formation on the CNTs. The CNT-coated paper showed a capacity of about 0.01 mAh/cm2 in the potentials relevant for a cathode (FIG. 25D).

$LiCoO_2$ (LCO, Sigma-Aldrich) and $Li_4Ti_5O_{12}$ (LTO, MTI Corp.) were chosen as cathode and anode materials, respectively. Slurries were prepared by mixing the active materials, carbon black (Timcal Super C45) and binder (PVDF, MTI Corp.) with a ratio of 8:1:1.3 by weight. The slurry was uniformly coated on the CNT-coated paper using doctor blading, followed by drying on a hot plate at 120° C. for 5 h. A piece of Cu or Al foil was used as metal backing layer to supplement the CNT/PVDF-coated paper current collector. FIG. 24C shows a typical SEM image of the active material composite (in this case, LCO) on the CNT-coated paper. The LTO electrodes also looked similar. Despite the low sheet resistivity, electrodes prepared using the CNT-coated paper as the substrate showed large capacity decay upon cycling in half-cells, particularly for the LCO half-cell (FIGS. 26A-B). Since the control tests showed some capacity in the cathode potential range (FIG. 25D), there could be some Li+ insertion in between CNT ropes that may cause them to lose contact with each other, the LCO particles, or the paper fibers during the electrochemical cycling, resulting in the capacity decay.

To address this, polyvinylidene difluoride (PVDF) was used as a binder to improve the CNT adhesion by coating an additional CNT/PVDF layer onto the CNT-coated papers prior to depositing the active materials. To add the PVDF binder and improve the cycling behavior, 3 mg/mL of CNT solution was sonicated in N-methyl-2-pyrrolidine (NMP) containing 6 mg/mL of PVDF for 30 mm to prepare a CNT/PVDF slurry. This slurry was coated on both sides of CNT-coated papers followed by drying at 120° C. on a hot plate. Then, the CNT-coated paper was placed on a piece of Al or Cu foil and soaked with NMP at 60° C. for half an hour in order to dissolve and redistribute PCDF from the surface CNT layer throughout the entire CNT-coated paper. Afterward, the CNT/PVDF-coated paper was dried at 120° C. for 4 hours. The paper could also be dried at 60° C. for 10 hours, after which it would display strong adhesion to the metal foil substrate. The final mass loading of CNTs on the paper was around 0.7 mg/cm2. The sheet resistivity of the papers increased from 3 to 10 Ω/square with addition of the PVDF. However, the final CNT/PVDF-coated papers showed good conductivity that would not change upon creasing or wrinkling.

Figure 26:
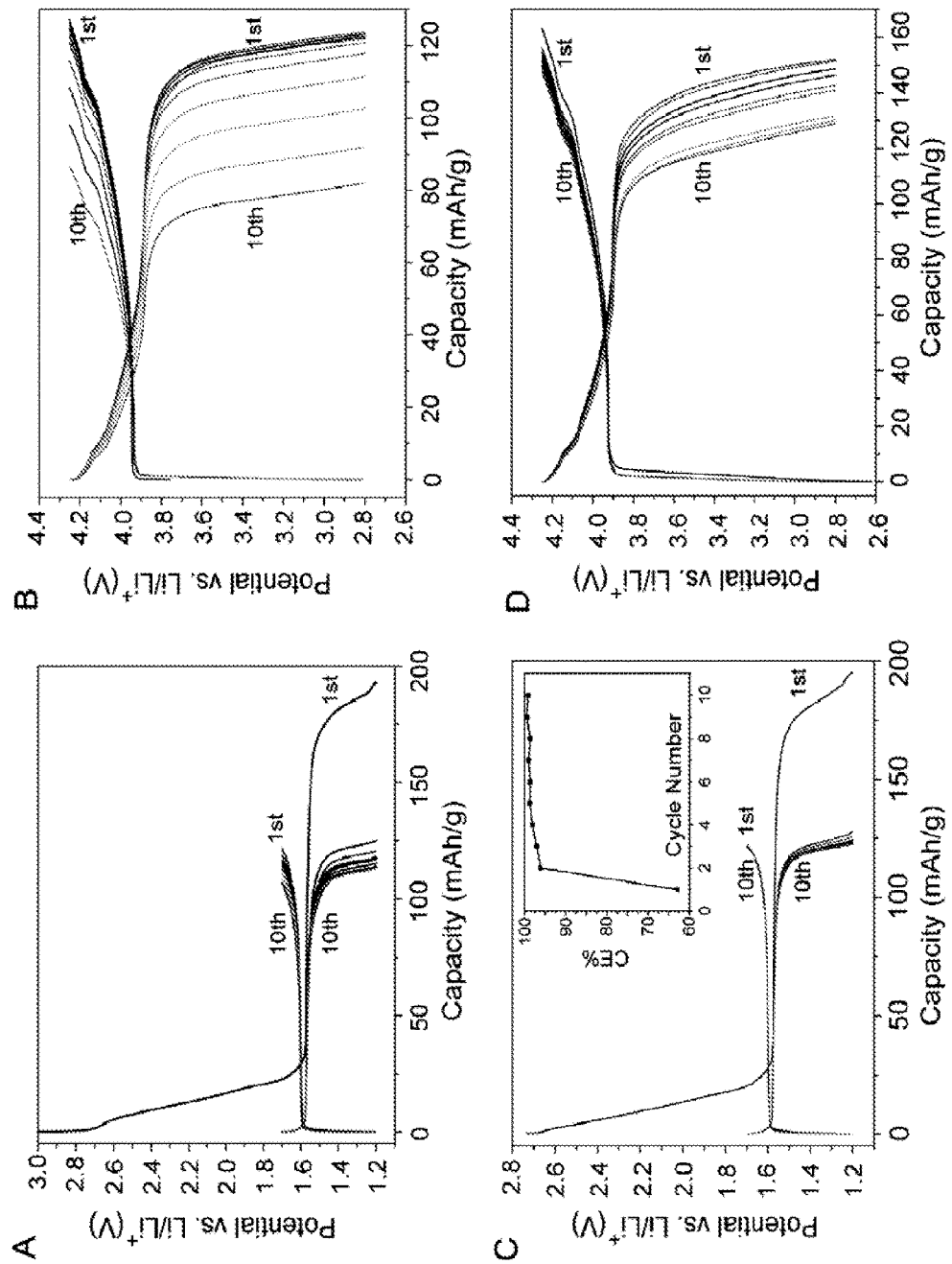
FIG. 26 shows the cycling results for half-cells using 25 mA/g for (A) LTO on CNT-coated paper; (B) LCO on CNT-coated paper; (C) LTO on CNT/PVDF coated paper (inset shows the Coulombic efficiency versus cycle number); and (D) LCO on CNT/PVDF-coated paper.

The electrochemical cycling results of half-cells prepared with the CNT/PVDP-coated papers using a current of 25 mA/g are shown in FIGS. 26C and D. The capacity retention for the anodes and cathodes was improved using the PVDF hinder on the CNT-papers and the discharge capacities were higher for LCO deposited on CNT/PVDF-papers (152 mAh/g in the first discharge compared to 122 mAh/g without the additional PVDF). The LTO anodes showed low Coulombic efficiency (CP) of 63% on the first cycle in half-cells regardless of the presence of additional PVDF (FIGS. 26 A,C). After the first cycle, the LTO electrode on CNT/PVDF-coated paper showed higher CE of 97-99% (FIG. 26C, inset) and good capacity retention. This suggests that the irreversible capacity loss could be due to solid-electrolyte interphase formation or other side reactions, such as with the functional groups on the CNTs, but that they were largely absent after the first charge. Therefore, the LTO electrodes were assembled in hall-cells and cycled once to remove irreversible capacities. After that, the half-cells were disassembled and the LTO electrodes were assembled in full cells. A mass ratio for LTO/LCO was around 1.5 to ensure enough anode material to prevent Li dendrite formation from overcharging.

Figure 27:
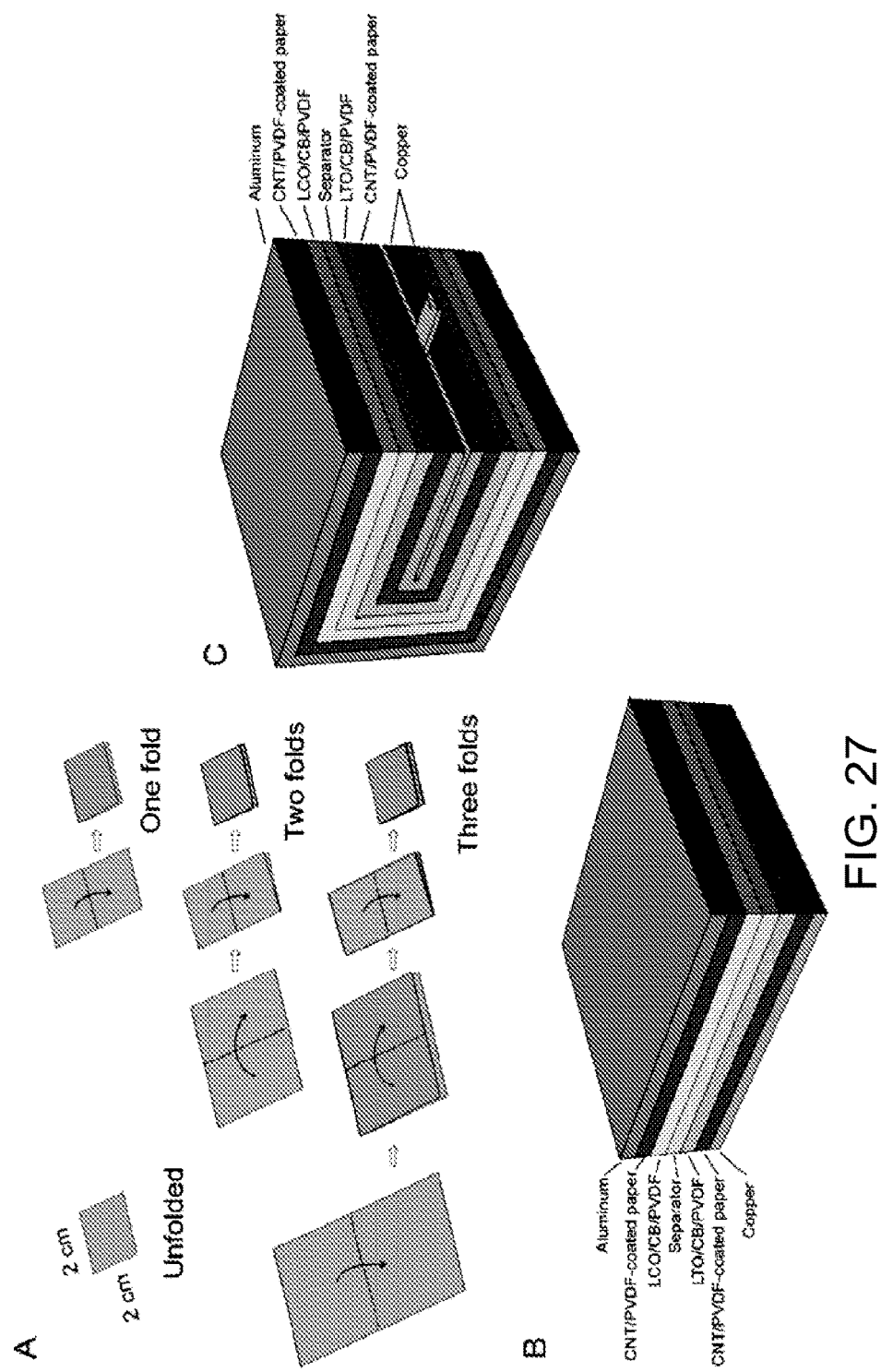
FIG. 27 shows (A) schematic of folding procedures for batteries with one fold, two folds, and three folds: (B) schematic showing a planar unfolded full cell; and (C) a full cell with one fold.

In order to understand the effect of folding on the electrochemical characteristics of foe electrodes, the films were folded as shown in FIG. 27A. A planar, unfolded cell (2 cm×2 cm) consisting of LTO/CNT/PVDF-coated paper as anode, monolayer polypropylene (Celgard 2500) as separator, and LCO/CNT/PVDF-coated paper as cathode was used as the control test. Cu and Al foils were used as additional current collectors and the cells were sealed in aluminized polyethylene (PE) bags (Sigma-Aldrich) as pouch cells. This planar full cell is shown schematically in FIG. 27B. To test the effect of a single fold, a 2 cm×4 cm cell was prepared in the same manner as the planar one and folded in half with the anode m the center of the cell (FIG. 27C). To test the effect of two folds, a 4 cm×4 cm cell was prepared and folded in half twice. Finally, a cell with three folds was prepared from an Initial area of 4 cm×8 cm. In all cases, a Cu tab was placed in between the folds to make contact to the LTO/CNT/PVDF-coated paper. The final geometric area of all of these cells was 2 cm×2 cm.

Figure 28:
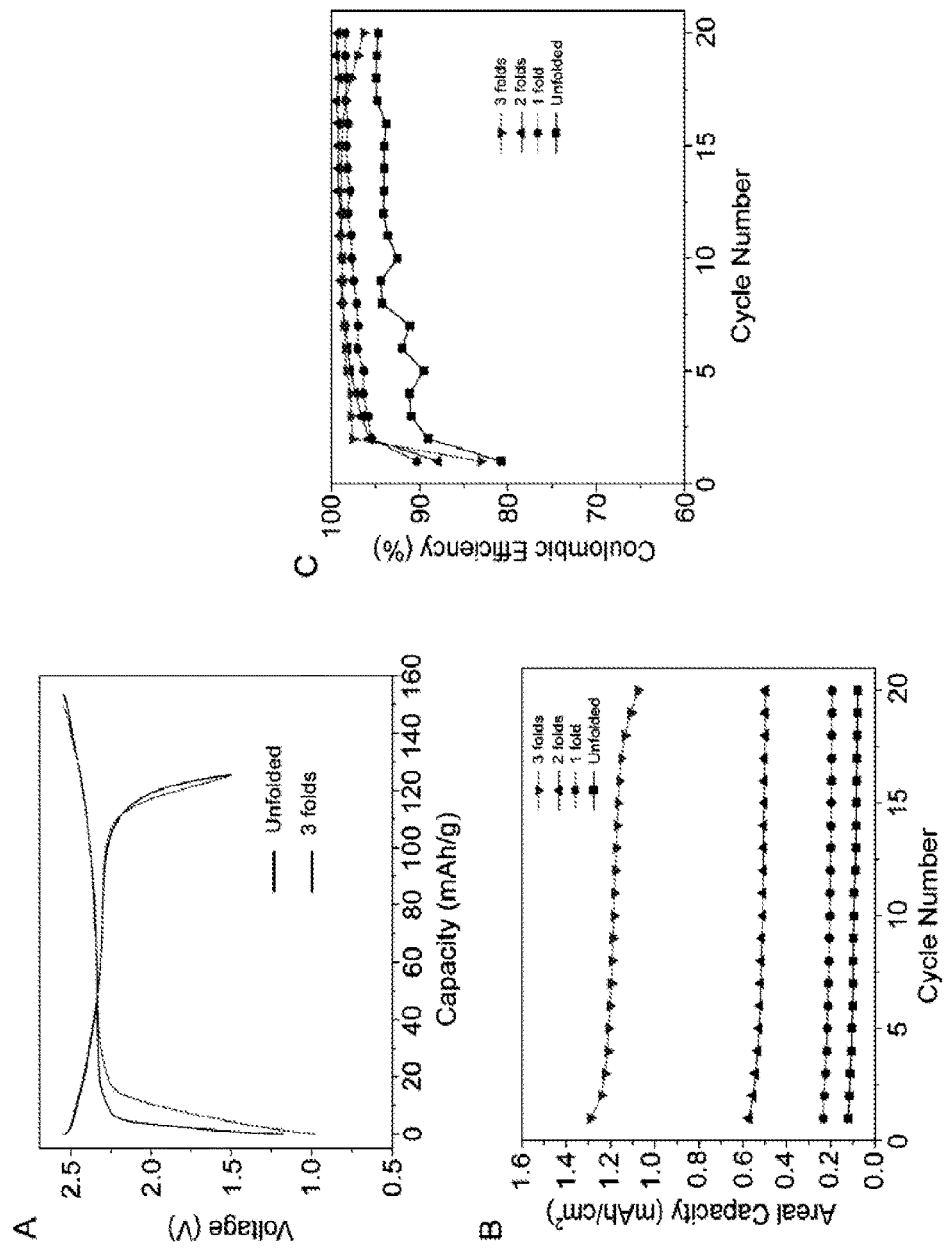
FIG. 28 shows (A) comparison of voltage profiles for unfolded full cell compared to cell with three folds; (B) comparison of areal discharge capacities; and (C) coulombic efficiencies for folded cells compared to unfolded, planar cell.

The voltage profiles for the folded cells looked very similar to the planar, unfolded cells and the cells displayed similar gravimetric capacities, FIG. 28A compares the first charge and discharge curve for the unfolded cell and cell with three folds. As shown in FIG. 28B, the areal capacities increased with increasing number of folds, as expected, since the amount of active material per square centimeter was increased. The amount of active material in each cell was slightly different since manual doctor blading was used but ranged from 0.92 to 1.29 mg/cm2 in. the unfolded state (Table 1). The batteries with one fold, two folds, and three folds had approximately 1.9×, 4.7×, and 10.6× the areal capacity compared to the planar one. The CE for the folded cells were higher than for the unfolded cell (FIG. 28C). The reason for the higher CE in the folded cells is not understood hut may be due to improved contact between the active materials layers and the CNTs after folding. These results show that the Li-ion batteries can still exhibit good electrochemical performance even alter multiple folds.

only two of these vertices and the specific capacity was almost identical to that in the unfolded cell.

Figure 31:
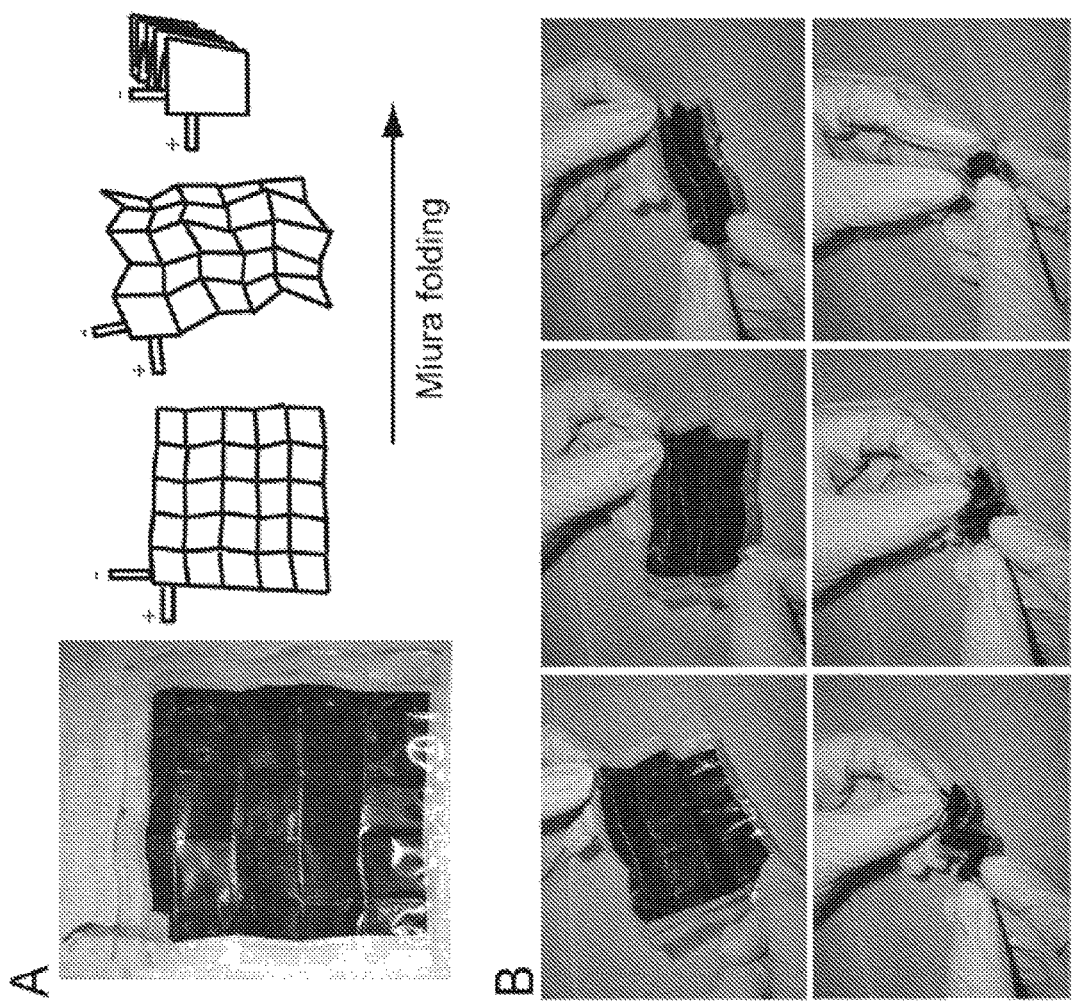
FIG. 31 shows (A) a schematic of Miura folding procedures for 5×5 pattern and photograph of 6 cm×7 cm battery sealed in Parylene-C (unfolded state); and (B) photographs of Miura folding to compact the battery to its folded state.

To increase the areal capacities further, Miura folding 43 was used to more efficiently compact and fold the paper (FIG. 31A). In these Miura batteries, additional Cu or Al current collectors were not used because they could not be folded that many times. Thus, the CNT/PVDF-coated papers served as the sole current collector. Double-sided tape was used to fix the Cu or Al metal tabs to the back of the CNT/PVDF-coated papers since no additional metal current collector was used. While the anode/separator/cathode layers could be compacted using Miura folding, the aluminized PE bags were too thick and did not crease well. Therefore, Parylene-C was used to prevent short-circuiting between adjacent layers after folding. Twenty grams of Parylene dimer were used to deposit 40 μm thick Parylene-C thin films on a flat glass mold using a Parylene coater (Specialty Coating Systems Labcoter 2). A release agent (2% Micro soap solution) was applied to the mold prior to the coating process. After the coating, the Parylene-C film was peeled off. The cells were sealed in between two Parylene-C films using an impulse sealer. The photographs in FIG. 31 show cells sealed in Parylene-C. The original area of the unfolded cell was 6 cm×7 cm and creases were applied to the entire stack to create a 5×5 Miura-ori pattern. After Miura folding, the stack consisted of 25 layers with a geometric area of 1.68 cm2 (FIG. 31B). Galvanostatic testing was performed using 25 mA/g rate. For long-term testing, the folded cells were sealed inside aluminized PE bags to prevent air leakage.

Figure 32:
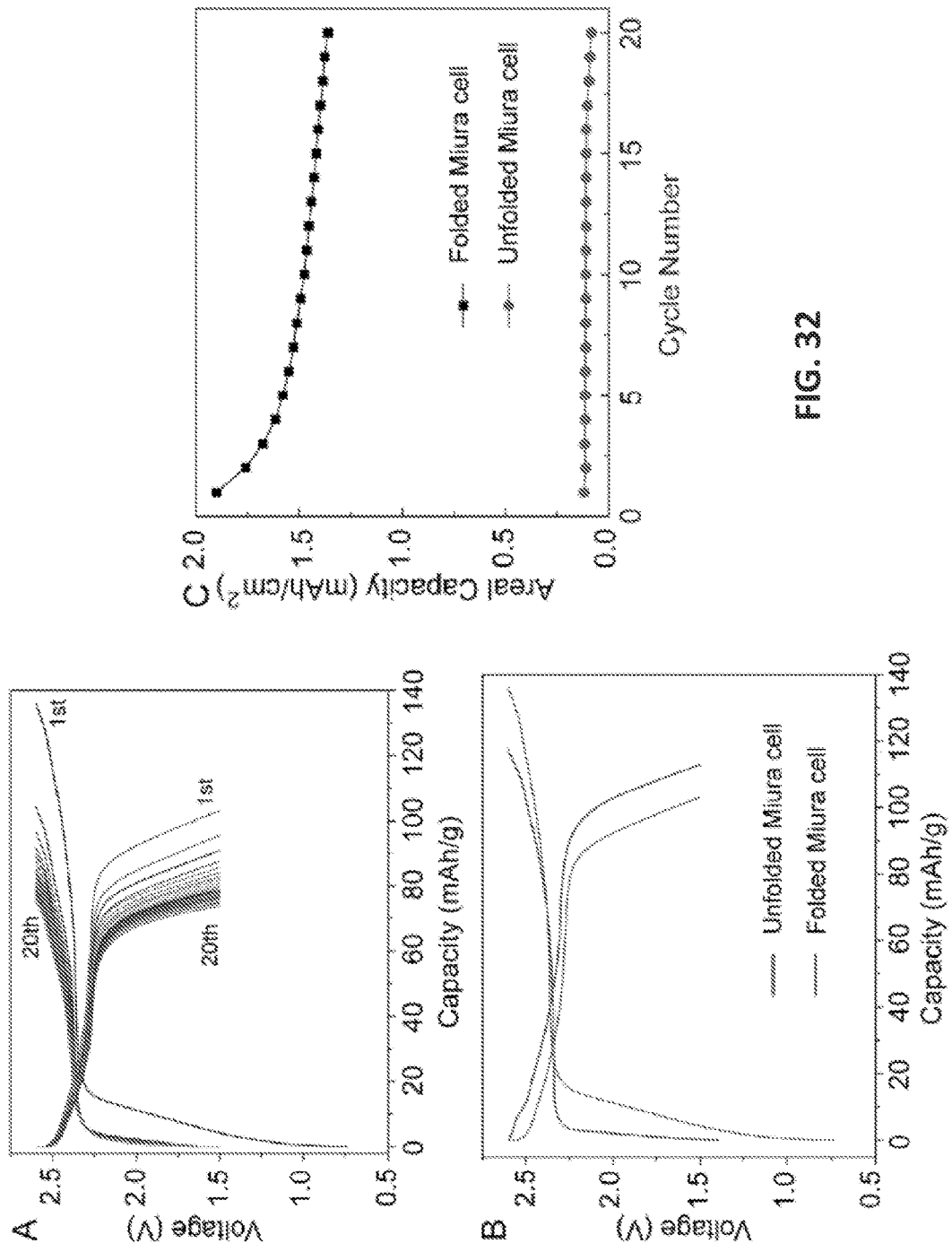
FIG. 32 compares folded versus unfolded Miura cells. (A) shows charging and discharging curves for Miura cell in the folded state. (B) shows the voltage profiles and (C) the areal discharge capacities for folded versus unfolded cells.

FIG. 32A shows the voltage profile for the Miura battery in its folded state. The discharge capacity was 103 mAh/g in the first cycle and decreased to 74 mAh/g in the $20^{th}$ cycle. The voltage profiles for the first charge/discharge for Miura battery when folded (red curve), and unfolded (blue curve)

TABLE 1

Mass loading and cell dimensions for unfolded and folded batteries

|  | Unfolded | 1 fold | 2 fold | 3 fold | Unfolded Miura-ori pattern | Folded Miura-ori pattern |
|---|---|---|---|---|---|---|
| Unfolded area (cm × cm) | 2 × 2 | 2 × 4 | 4 × 4 | 4 × 8 | 6 × 7 | 6 × 7 |
| Mass loading before folding (mg/cm$^2$) | 0.9715 | 0.9284 | 1.2519 | 1.2887 | 1.0541 | 0.7365 |
| Area after folding (cm × cm) | 2 × 2 | 2 × 2 | 2 × 2 | 2 × 2 | 6 × 7 | 1.2 × 1.4 |

Figure 29:
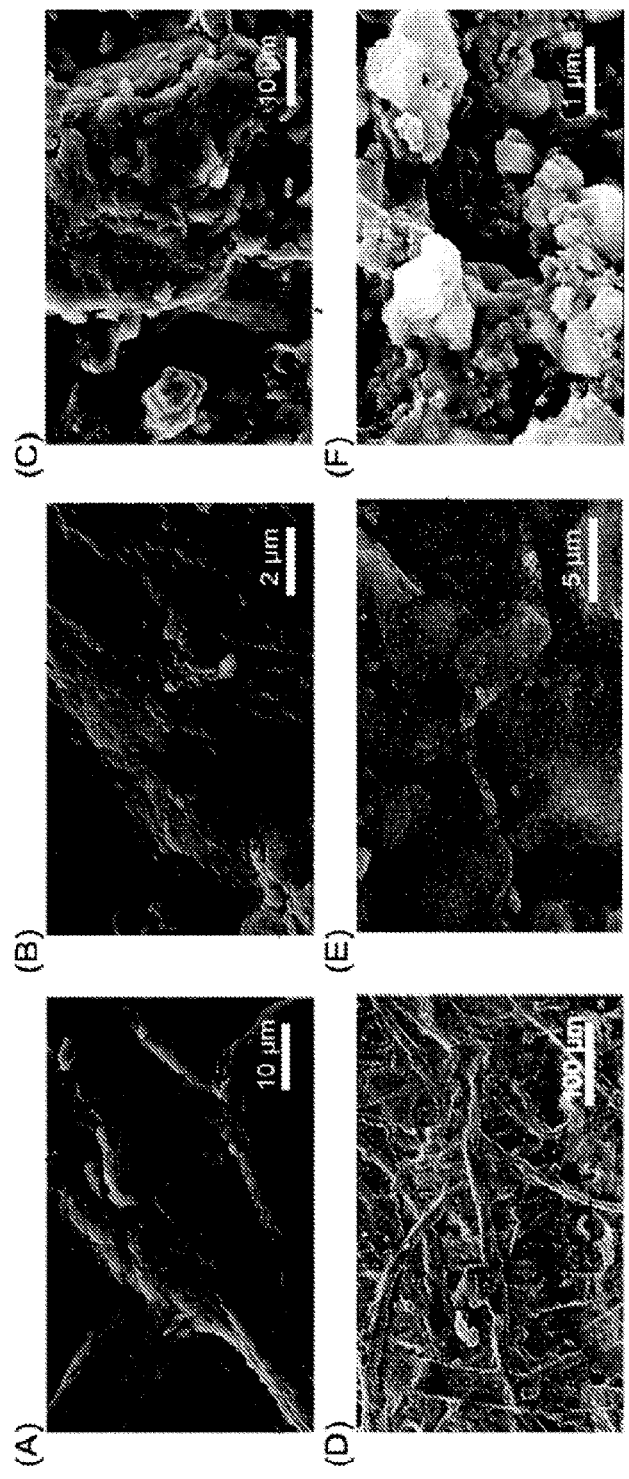
FIG. 29 shows SEM images of electrodes alter folding and unfolding, zooming in at a crease resulting from one fold (approximate location indicated with dashed line). All images are from electrode alter cycling. (A) and (B) are from the backside of the cathode, showing the bare surface of the CNT/PVDF paper; (C) is iron the front side of the cathode, showing the LCO layer surface; (D) and (E) are from the backside of the anode; and (F) is from the front side of the anode, showing the LTD layer surface.
Figure 30:
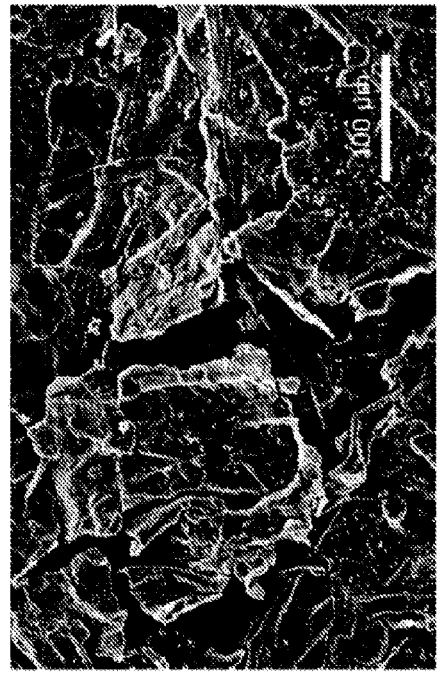
FIG. 30 shows SEM images of electrodes after folding and unfolding, zooming in at a crease resulting from the intersection of two folds (approximate location indicated with dashed lines). Both images are from the back, of an electrode after cycling, showing the CNT layer with (A) being at low magnification and (B) being a zoomed m version of the same region.
Figure 30:

SEM imaging was employed to observe the morphology of the folded electrodes alter cycling. FIG. 29 shows the images of the front side (containing the active material layer) and backside (containing CNTs only) of the cathode and anode in the region of a crease resulting from a single fold. No discernible cracking, delamination, or other change in microstructure was observed compared to the planar electrodes (FIG. 24). When looking at the vertex corresponding to the intersection of two perpendicular folds, some delamination of the CNT-layer was observed, revealing the paper fibers underneath (FIG. 30). However, for away from the intersection, no delamination was observed as shown in FIG. 29. These results show that lower specific capacities (compared to planar cells) In batteries with high degrees of folding may be due to poor adhesion of the CNT coating at the high stress regions found at vertices. The data in FIG. 28A indicate that this delamination may not play a large role in the cells with three folds, because there were are compared in FIG. 32B. The battery in the folded state showed a slightly lower discharge capacity of 103 mAh/g compared to 113 mAh/g when unfolded. Compared to the results for the cell with three folds (FIG. 28A), the gravimetric capacity was lower in the folded cell. The lower specific capacity in the folded cell may indicate that some of the active material was inaccessible to the electrolyte after folding. It could also be due to delamination at the intersections of perpendicular folds, since the 5×5 Miura pattern contains 16 of these vertices. The charging curve of the folded Miura cell was also shifted up to higher potentials and the discharge curve was shifted to lower potentials compared to the unfolded state. This suggests that there are some internal resistance losses for the cell in the folded state as a result of using the CNT/PVDF-coated papers as the sole current collectors. However, these potential differences were only 50 mV. The internal resistance losses can also be responsible for why the gravimetric capacities are lower in the Miura folded batteries compared to the simple folded cells, which had Cu and Al foil backing layers underneath the CNT/PVDF-coated papers. However, the Miura folding still resulted in a significant increase in areal capacity compared to the planar cells. As shown in FIG. 32C, the areal capacity was about 14× higher for the folded Miura cell at the 20th cycle, indicating that the Miura folding could be used to Increase the energy density of the Li-ion battery.

In conclusions we have shown that paper-folding concepts can be applied to Li-ion batteries in order to realize a device with higher areal energy densities. CNTs coated with ordinary laboratory Kimwipes and modified with PVDF binder were effective current collectors for the LTD anodes and LCO cathodes to allow for current flow throughout the folded batteries, Parylene-C was utilized as the Li-ion battery packaging to prevent short-circuits alter Miura folding. Advances in geometric folding algorithms and computational tools to determine folding patterns for making complex 3 D structures from planar 2D sheets may lead to numerous other configurations possible for 3D batteries. Furthermore, with advances in robot manipulation including paper folding by robots, the manufacturability of folded batteries at scale may be possible in the near future.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A lithium-ion battery comprising:
a packaging material;
an anode current collector;
an anode electrode;
a separator;
a cathode electrode; and
a cathode current collector;
wherein the packaging material, the anode current collector, the anode electrode, the separator, the cathode electrode, and the cathode current collector are layered to form a planar lithium-ion battery, and the planar lithium-ion battery is folded using rigid origami to yield a deformable lithium-ion battery.

2. The lithium-ion battery of claim 1, wherein the anode current collector comprises a carbon-nanotube-coated paper substrate or a metal foil.

3. The lithium-ion battery of claim 2, wherein the metal foil comprises copper or aluminum.

4. The lithium-ion battery of claim 1, wherein the cathode current collector comprises a carbon-nanotube-coated paper substrate or a metal foil.

5. The lithium-ion battery of claim 1, wherein the maximum output power of the deformable lithium-ion battery changes less than 1% while the deformable lithium-ion battery undergoes 1300% linear deformation.

6. The lithium-ion battery of claim 1, wherein the maximum output power of the deformable lithium-ion battery changes less than 1% while the deformable lithium-ion battery undergoes twisting of 10.8° per cm.

7. The lithium-ion battery of claim 1, wherein the maximum output power of the deformable lithium-ion battery changes less than 1% while the deformable lithium-ion battery is bent with a bending radius of 0.83 cm.

8. The lithium-ion battery of claim 1, wherein the packaging material comprises polyethylene.

9. The lithium-ion battery of claim 8, wherein the packaging material comprises aluminized polyethylene.

10. The lithium-ion battery of claim 1, wherein the packaging material comprises a monochlorosubstituted poly(para-xylylene).

11. The lithium-ion battery of claim 1, wherein a thickness of the planar lithium-ion battery is less than 500 μm.

12. The lithium-ion battery of claim 1, wherein the rigid origami comprises Miura folding.

13. The lithium-ion battery of claim 12, wherein the Miura folding is a 45° Miura folding.

14. The lithium-ion battery of claim 12, wherein the Miura folding is a 90° Miura folding.

15. The lithium-ion battery of claim 12, wherein the Miura folding can be other rigid origami folding.

16. A method of making a lithium-ion battery, the method comprising:
layering a packaging material, an anode current collector, an anode electrode, a separator, a cathode electrode, and a cathode current collector to form a planar lithium-ion battery; and
folding the planar lithium-ion battery using rigid origami to yield a deformable lithium-ion battery.

17. The method of claim 16, wherein the anode current collector comprises a carbon-nanotube-coated paper substrate or a metal foil.

18. The lithium-ion battery of claim 16, wherein the cathode current collector comprises a carbon-nanotube-coated paper substrate or a metal foil.

19. The lithium-ion battery of claim 18, wherein the metal foil comprises copper or aluminum.

20. The method of claim 16, wherein folding the planar lithium-ion battery using rigid origami comprises Miura folding.

21. The method of claim 20, wherein the Miura folding is a 45° Miura folding.

22. The method of claim 21, further comprising completely compressing the deformable lithium-ion battery in one direction.

23. The method of claim 20, wherein the Miura folding is a 90° Miura folding.

24. The method of claim 23, further comprising completely collapsing the deformable lithium-ion battery in biaxial directions.

25. The method of claim 16, further comprising deforming the deformable lithium-ion battery, wherein the maximum output power of the deformable lithium-ion battery changes less than 1% while the deformable lithium-ion battery undergoes 1300% linear deformation.

26. The method of claim 16, further comprising twisting the deformable lithium-ion battery, wherein the maximum output power of the deformable lithium-ion battery changes less than 1% while the deformable lithium-ion battery undergoes twisting of 10.8° per cm.

27. The method of claim 16, further comprising bending the deformable lithium-ion battery, wherein the maximum output power of the deformable lithium-ion battery changes less than 1% while the deformable lithium-ion battery undergoes bending with a bending radius of 0.83 cm.

* * * * *